(12) United States Patent
Inada et al.

(10) Patent No.: US 6,925,090 B2
(45) Date of Patent: Aug. 2, 2005

(54) HIGH-SPEED DIGITAL TRANSMISSION METHOD ALLOWING PLURALITY OF VOICE SERVICES BY USE OF SINGLE SUBSCRIBER LINE

(75) Inventors: Kazuhiko Inada, Fukuoka (JP); Noriki Kajizaki, Fukuoka (JP); Hiroshi Kinoshita, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 377 days.

(21) Appl. No.: 09/909,808

(22) Filed: Jul. 19, 2001

(65) Prior Publication Data

US 2001/0050917 A1 Dec. 13, 2001

Related U.S. Application Data

(63) Continuation of application No. PCT/JP99/00186, filed on Jan. 20, 1999.

(51) Int. Cl.[7] ............................................. H04L 12/28
(52) U.S. Cl. ........................ 370/421; 370/442; 370/463
(58) Field of Search ................................ 370/352–354, 370/286–287, 437–442, 463–468, 259, 263–264, 522–524, 489–490, 219–222, 419–421; 375/222, 254, 219–231, 240.28; 379/93.01–93.08

(56) References Cited

U.S. PATENT DOCUMENTS

| | | | | |
|---|---|---|---|---|
| 6,259,708 B1 | * | 7/2001 | Cheng et al. | 370/493 |
| 6,307,839 B1 | * | 10/2001 | Gerszberg et al. | 370/235 |
| 6,310,909 B1 | * | 10/2001 | Jones | 375/220 |
| 6,314,102 B1 | * | 11/2001 | Czerwiec et al. | 370/395.6 |
| 6,373,860 B1 | * | 4/2002 | O'Toole et al. | 370/493 |
| 6,393,110 B1 | * | 5/2002 | Price | 379/93.01 |
| 6,452,987 B1 | * | 9/2002 | Larsson et al. | 375/345 |
| 6,498,806 B1 | * | 12/2002 | Davis | 375/222 |
| 6,522,688 B1 | * | 2/2003 | Dowling | 375/222 |
| 6,522,730 B1 | * | 2/2003 | Timm et al. | 379/93.08 |
| 6,560,244 B1 | * | 5/2003 | Huber | 370/524 |
| 6,597,732 B1 | * | 7/2003 | Dowling | 375/222 |
| 6,647,024 B1 | * | 11/2003 | Dombkowski et al. | 370/493 |

FOREIGN PATENT DOCUMENTS

| | | |
|---|---|---|
| JP | 1-98397 | 4/1989 |
| JP | 1-238238 | 9/1989 |
| JP | 10-126819 | 5/1998 |
| JP | 10-154949 | 6/1998 |

OTHER PUBLICATIONS

"Q &A ADSL gijutsu towa?" NTT Gijutsu Journal, vol. 6, No. 12, Dec. 1, 1994, p. 73.
"Tokushuu xDSL no zembou Kaiteki Internet heno toppakou", Nikkei Communication, vol. 252, Aug. 18, 1997, p. 74–100.
"xDSL gigjutsu: Denwasen de 50M bit/byou ga kanou ni" Nikkei Communication, vol. 229, Sep. 2, 1996, p. 74–75.

* cited by examiner

*Primary Examiner*—Zarni Maung
*Assistant Examiner*—Van Kim T. Nguyen
(74) *Attorney, Agent, or Firm*—Katten Muchin Zavis Rosenman

(57) ABSTRACT

The present invention relates to a high-speed digital transmission method using an analog subscriber line (for example, an existing telephone-use copper cable), a subscriber accommodating system used in the high-speed digital transmission method, an accommodating device on a subscriber-terminal side and an accommodating device on an accommodating station side. The present invention includes the steps of providing a subscriber distributing device, to which a plurality of subscribers are connected, on a subscriber-terminal side of an analog subscriber line in a high-speed digital transmission method using the analog subscriber line; setting a low-frequency band part as a control channel; setting a high-frequency band part as one or a plurality of communication channels; and controlling the one or plurality of communication channels by use of the control channel. The plurality of subscribers communicate by using the same analog subscriber line.

5 Claims, 43 Drawing Sheets

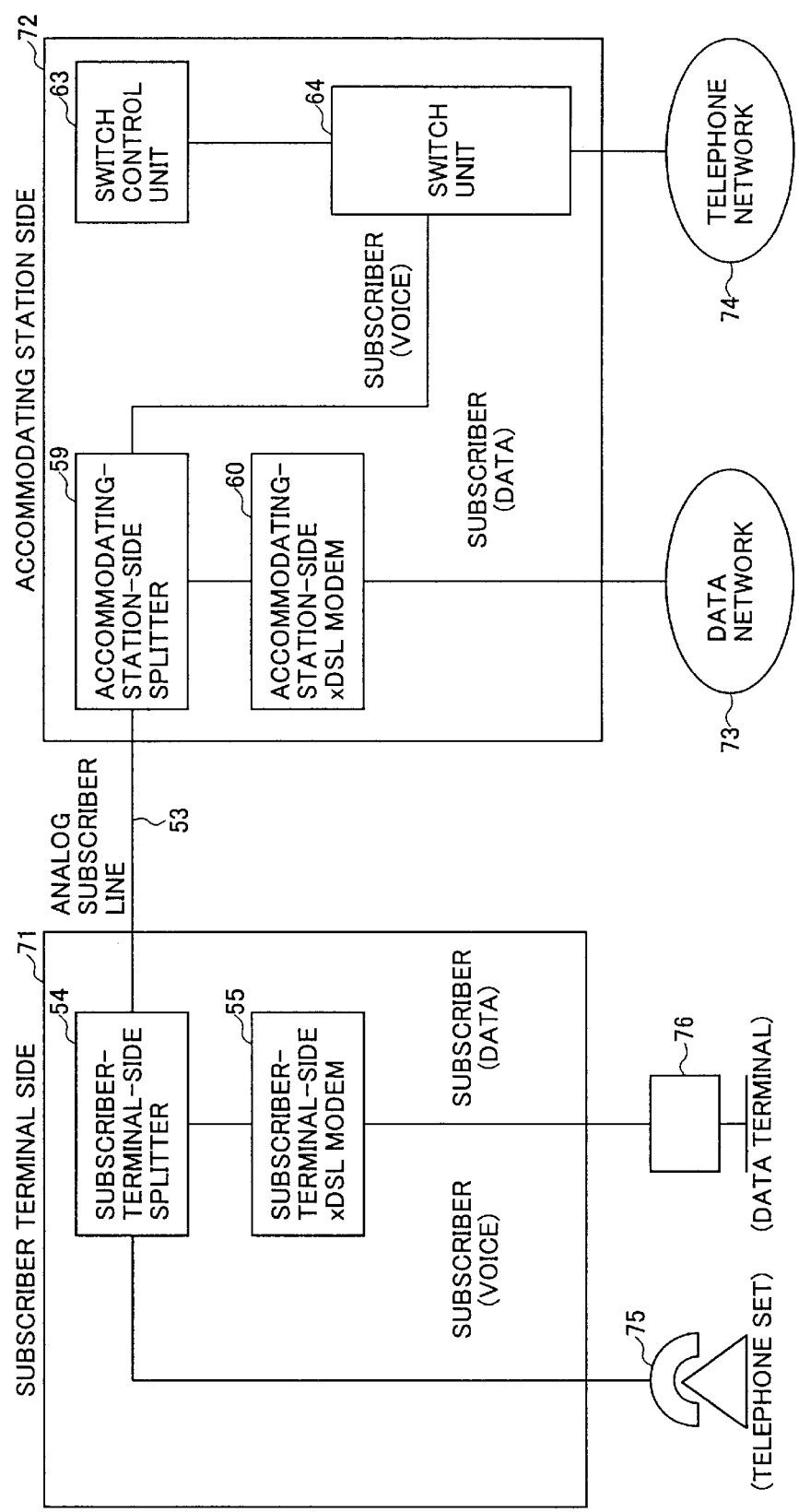

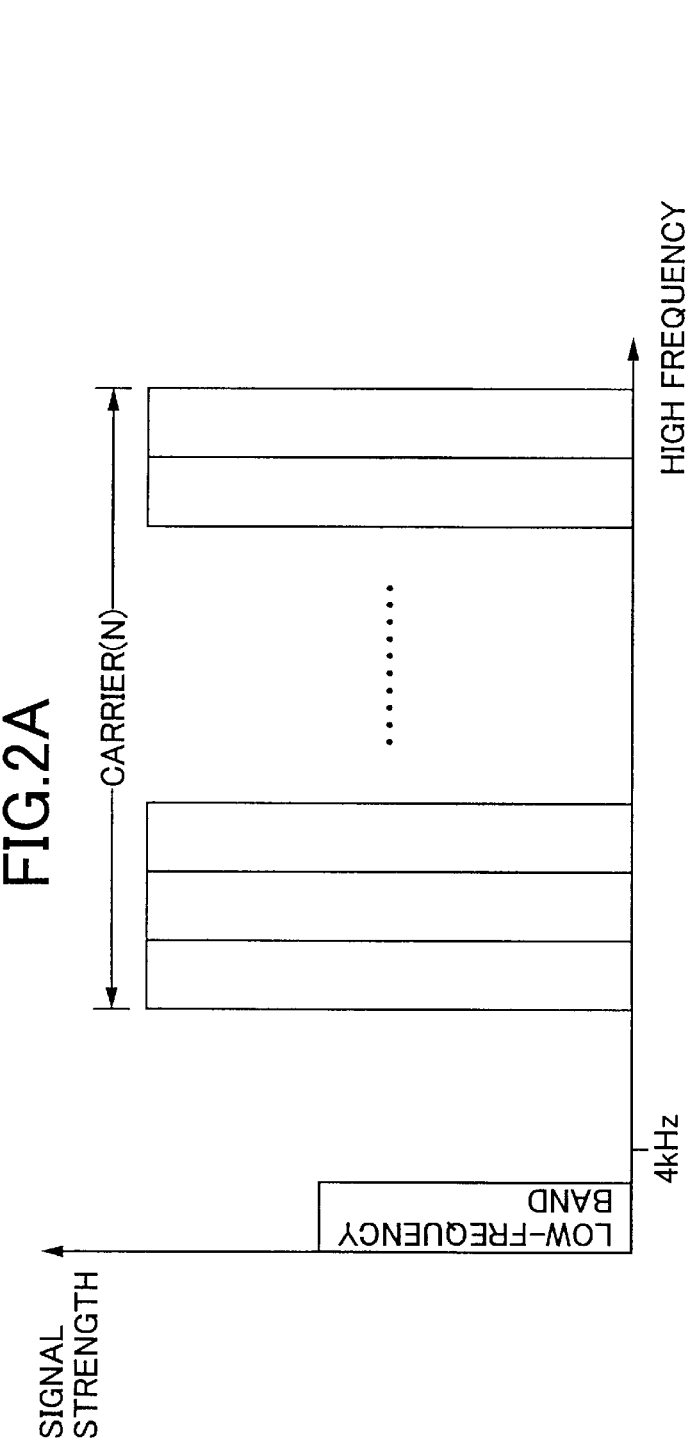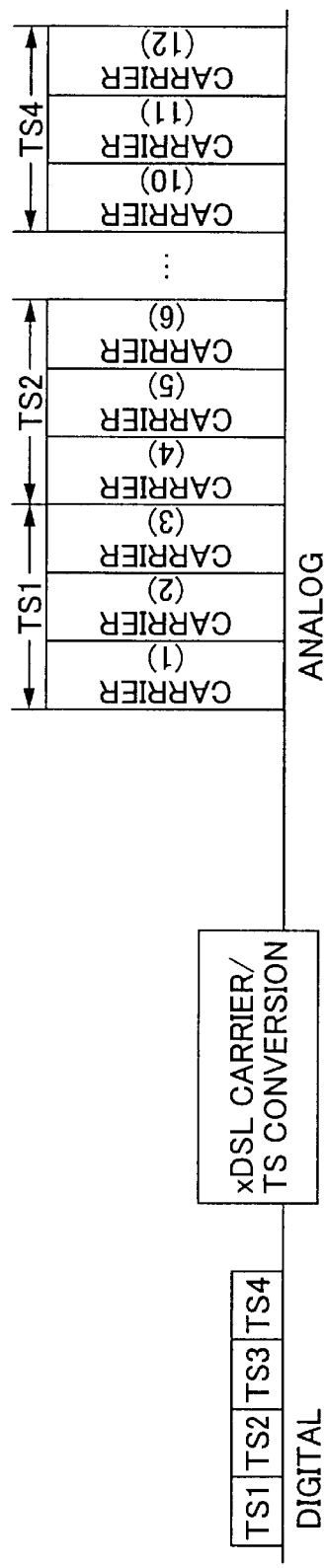

MSG:MESSAGE TYPE
   02:VOICE-BAND NOTIFICATION
Sub-MSG:SUB-MESSAGE TYPE
   02:NOTIFICATION
SQN:SEQUENCE NUMBER
Length:DATA LENGTH
Band:VOICE-BAND INFORMATION
NTSNo:NUMBER OF TS MSG:MESSAGE TYPE
   02:VOICE-BAND NOTIFICATION
Sub-MSG:SUB-MESSAGE TYPE
   01:RESPONSE
SQN:SEQUENCE NUMBER
Length:DATA LENGTH MSG:MESSAGE TYPE
    03:TIMESLOT ALLOCATION
Sub-MSG:SUB-MESSAGE TYPE
    01:RESPONSE
SQN:SEQUENCE NUMBER
CRV:SUBSCRIBER NUMBER
TSNo:TIMESLOT NUMBER MSG:MESSAGE TYPE
  03:TIMESLOT ALLOCATION
Sub-MSG:SUB-MESSAGE TYPE
  02:NOTIFICATION
SQN:SEQUENCE NUMBER
Length:DATA LENGTH
CRV:SUBSCRIBER NUMBER
TSNo:TIMESLOT NUMBER MSG:MESSAGE TYPE
  03:TIMESLOT ALLOCATION
Sub-MSG:SUB-MESSAGE TYPE
  01:RESPONSE
SQN:SEQUENCE NUMBER
CRV:SUBSCRIBER NUMBER
Length:DATA LENGTH
TSNo:TIMESLOT NUMBER CRV No:SUBSCRIBER NUMBER TSNo   :TIMESLOT NUMBER TS No:TS NUMBER ON ANALOG-
    SUBSCRIBER-LINE SIDE STSNo:DESTINATION TS NUMBER
    OF SWITCH UNIT MSG:MESSAGE TYPE
  21:SUBSCRIBER-CONDITION
      REQUEST
Sub-MSG:SUB-MESSAGE TYPE
  00:REQUEST
SQN:SEQUENCE NUMBER
Length:DATA LENGTH
CRV:SUBSCRIBER NUMBER MSG:MESSAGE TYPE
   21:SUBSCRIBER-CONDITION
     REQUEST
Sub-MSG:SUB-MESSAGE TYPE
   01:RESPONSE
SQN:SEQUENCE NUMBER
Length:DATA LENGTH
PS:SUBSCRIBER CONDITION
   00:IN SERVICE
   01:OUT OF SERVICE
SS:SUBSCRIBER-CONDITION
   SUPPLEMENTARY DATA
   00:NORMAL
   01:FAILED
CRV:SUBSCRIBER NUMBER MSG:MESSAGE TYPE
　　11:SUBSCRIBER-CONDITION
　　　REQUEST
Sub-MSG:SUB-MESSAGE TYPE
　　00:REQUEST
SQN:SEQUENCE NUMBER
Length:DATA LENGTH
CRV:SUBSCRIBER NUMBER MSG:MESSAGE TYPE
   11:SUBSCRIBER-CONDITION
      NOTIFICATION
Sub-MSG:SUB-MESSAGE TYPE
   01:RESPONSE
SQN:SEQUENCE NUMBER
Length:DATA LENGTH
PS:SUBSCRIBER CONDITION
   00:IN SERVICE
   01:OUT OF SERVICE
SS:SUBSCRIBER-CONDITION
   SUPPLEMENTARY DATA
   00:NORMAL
   01:FAILED
CRV:SUBSCRIBER NUMBER

CRV:SUBSCRIBER NUMBER

PS:SUBSCRIBER CONDITION
    00:IN SERVICE
    01:OUT SERVICE

SS:SUBSCRIBER-CONDITION
    SUPPLEMENTARY DATA
    00:NORMAL
    01:FAILED

CRV:SUBSCRIBER NUMBER

PS:SUBSCRIBER CONDITION
  00:IN SERVICE
  01:OUT SERVICE

SS:SUBSCRIBER-CONDITION
  SUPPLEMENTARY DATA
  00:NORMAL
  01:FAILED

United States Patent 6,925,090 B2

HIGH-SPEED DIGITAL TRANSMISSION METHOD ALLOWING PLURALITY OF VOICE SERVICES BY USE OF SINGLE SUBSCRIBER LINE

This application is a continuation of international application number PCT JP99/00186, filed Jan. 20, 1999.

BACKGROUND OF THE INVENTION

1. Field of the Invention

The present invention relates to a high-speed digital transmission method using an analog subscriber line, a subscriber accommodating system used in the high-speed digital transmission method, an accommodating device on a subscriber-terminal side and an accommodating device on an accommodating station side.

More particularly, the present invention relates to a high-speed digital transmission method using a subscriber line that allows a plurality of voice services by use of a single analog subscriber line in a call network using an xDSL technology, a subscriber accommodating system used in the high-speed digital transmission method, an accommodating device on a subscriber-terminal side and an accommodating device on an accommodating station side.

2. Description of the Related Art

Attention is being given to an xDSL (x digital subscriber line) technology in accordance with recent propagation of the Internet, wherein the XDSL is a high-speed digital transmission method using an existing telephone copper cable (subscriber line). An xDSL includes a symmetric-speed type in which an upstream speed and a downstream speed are the same, and an asymmetric-speed type in which the upstream speed and the downstream speed are different.

A symmetric-speed type xDSL is a SDSL (Single line DSL), for example. An asymmetric-speed type xDSL is an ADSL (asymmetric DSL) or a VDSL (Very high bit rate DSL), for example. In either case in which the xDSL is the symmetric-speed type or the asymmetric-speed type, simultaneous usage of a single telephone set and a single data terminal by use of a single analog subscriber line is achieved by employing a low-frequency band for a voice service and a high-frequency band for data communication.

FIG. 1 shows an example of a related art using the xDSL. This example is composed of a subscriber-terminal-side accommodating device 71, an accommodating-station-side accommodating device 72, a general data network 73, a general telephone network 74, a telephone set 75 and a data terminal 76.

The subscriber-terminal-side accommodating device 71 is an accommodating device that accommodates a plurality of subscribers, and is installed on a subscriber-terminal side (each user's house, and etc). This subscriber-terminal-side accommodating device 71 is composed of a subscriber-terminal-side splitter 54 and a subscriber-terminal-side xDSL modem 55. The subscriber-terminal-side splitter 54 separates a signal received from an analog subscriber line 53 into a low-frequency band and a high-frequency band. Additionally, the subscriber-terminal-side splitter 54 combines the low-frequency band and the high-frequency band of a signal, and transmits the signal to the analog subscriber line 53. The subscriber-terminal-side xDSL modem 55 is a modem for the data terminal 76 to carry out data communication by use of the analog subscriber line 53.

Further, the accommodating-station-side accommodating device 72 is an accommodating device that accommodates a plurality of subscribers, and is installed on an accommodating-station side (a switch station of a common carrier). This accommodating-station-side accommodating device 72 is composed of an accommodating-station-side splitter 59, an accommodating-station-side xDSL modem 60, a switch control unit 63 and a switch unit 64. The accommodating-station-side splitter 59 separates a signal received from the analog subscriber line 53 into a low-frequency band and a high-frequency band. Additionally, the accommodating-station-side splitter 59 combines the low-frequency band and the high-frequency band of a signal, and transmits the signal to the analog subscriber line 53. The accommodating-station-side xDSL modem 60 is a modem for a data terminal (not shown in the figures) connected to the general data network 73 to carry out data communication with the data terminal 76 through the analog subscriber line 53, by modulating or demodulating a signal from the data terminal connected to the general data network 73. The switch control unit 63 is a control unit that controls the switch unit 64 having a switch function.

The analog subscriber line 53 transmits voice and data. A line between the telephone set 75 and the telephone network 74 is connected by the subscriber-terminal-side splitter 54, the accommodating-station-side splitter 59 and the switch unit 64. Consequently, voice communication is carried out between the telephone set 75 and the telephone network 74.

The data terminal 76 is connected to the data network 73 by the subscriber-terminal-side xDSL modem 55, the subscriber-terminal-side splitter 54, the accommodating-station-side splitter 59 and the accommodating-station-side xDSL modem 60, and carries out data communication with the data network 73.

In a related-art telephone network, a new analog subscriber line is necessarily constructed between an accommodating station and a subscriber, every time the number of analog telephone subscribers increases. There are choices such as a BRI (Basic Rate Interface) and a PRI (Primary Rate Interface) in an ISDN (Integrated Services Digital Network). However, only two subscribers can be accommodated by use of a single analog subscriber line in the BRI. On the other hand, in the PRI, twenty-three subscribers can be accommodated by use of a single analog subscriber line, but new exclusive cables must be constructed between an accommodating station and the subscribers.

Additionally, a related-art xDSL line can accommodate a single analog telephone set and a single data terminal by use of a single analog subscriber line, but cannot accommodate more than or equal to two analog telephone sets. Accordingly, a method of accommodating a large number of analog telephone sets through a single analog subscriber line by using an existing analog subscriber line has been demanded.

SUMMARY OF THE INVENTION

Accordingly, it is a general object of the present invention to provide a communication service to a large number of subscribers, achieving accommodation of the large number of subscribers by use of an existing analog subscriber line without constructing new subscriber lines between an accommodating station and the large number of subscribers, even if the number of subscribers increases.

Another object of the present invention is to solve a problem that a usable high-frequency band of an xDSL line varies according to its noise characteristic.

The above-described objects of the present invention is achieved by a high-speed digital transmission method using an analog subscriber line, including the steps of providing a subscriber distributing device, to which a plurality of subscribers are connected, in a subscriber terminal corresponding to the analog subscriber line; setting a low-frequency band part as a control channel, and a high-frequency band part as one or a plurality of communication channels; and controlling the one or plurality of communication channels by using the control channel, wherein the plurality of subscribers communicate by using the analog subscriber line.

The above-described objects of the present invention is also achieved by a subscriber accommodating system, including a subscriber-terminal-side accommodating device connected to a high-speed digital transmission path using an analog subscriber line; and an accommodating-station-side accommodating device connected to the high-speed digital transmission path using the analog subscriber line, wherein the subscriber-terminal-side accommodating device includes a subscriber distributing device, to which a plurality of subscribers are connected; sets a low-frequency band part as a control channel; sets a high-frequency band part as one or a plurality of communication channels; and controls the one or plurality of communication channels by using the control channel, wherein the plurality of subscribers communicate by using the analog subscriber line.

For instance, the present invention achieves the above-described objects by digitalizing a high-frequency band of an xDSL line using a single existing analog subscriber line, dividing the high-frequency band into timeslots, and assigning a plurality of subscribers to the timeslots. Accordingly, the present invention accomplishes proving a communication service without constructing a new analog subscriber line between an accommodating station and a subscriber even if the number of analog telephone subscribers increases.

Other objects, features and advantages of the present invention will become more apparent from the following detailed description when read in conjunction with the accompanying drawings.

BRIEF DESCRIPTION OF THE DRAWINGS

FIG. 1 is a block diagram showing an example of a related art using an xDSL;

FIGS. 2A and 2B are diagrams showing a signal format of the present invention;

DESCRIPTION OF THE PREFERRED EMBODIMENTS

A description will now be given of preferred embodiments of the present invention, with reference to the accompanying drawings.

FIG. 2A shows an xDSL signal that is composed of a low-frequency signal and a high-frequency signal composed of N carriers ("N" is an integer greater than or equal to 2).

In the present invention, a low-frequency band of the xDSL signal for voice is used as a control channel, and a high-frequency band of the xDSL signal is used as a speech channel. A high-frequency band of an xDSL signal shown on a right side of FIG. 2B is converted to timeslots, as a signal shown on a left side of FIG. 2B. Subsequently, a digitalized voice signal from each subscriber is inserted to the timeslots, and, then, transmitted.

Theoretically speaking, a timeslot converter converting the carriers of the high-frequency band of the xDSL signal in placed between the signal of the left and the signal on the right, and a voice signal is converted from an analog format to a digital format. In this case, a relation between the carriers and the timeslots does not have to be a 3-to-1 ratio, as shown in FIG. 2B, and can be an m-to-p ratio ("m" and "p" are integers greater than or equal to 1).

Additionally, in order to achieve the objects of the present invention, a subscriber-terminal-side control-channel control unit, a subscriber-terminal-side timeslot control unit and a subscriber-monitoring control unit are added to a related-art xDSL transmission system, on a subscriber-terminal side, as described later. An accommodating-station-side control-channel control unit and an accommodating-station-side timeslot control unit are added to the related-art xDSL transmission system, on an accommodating station (switch station) side, as described later.

Figure 3:
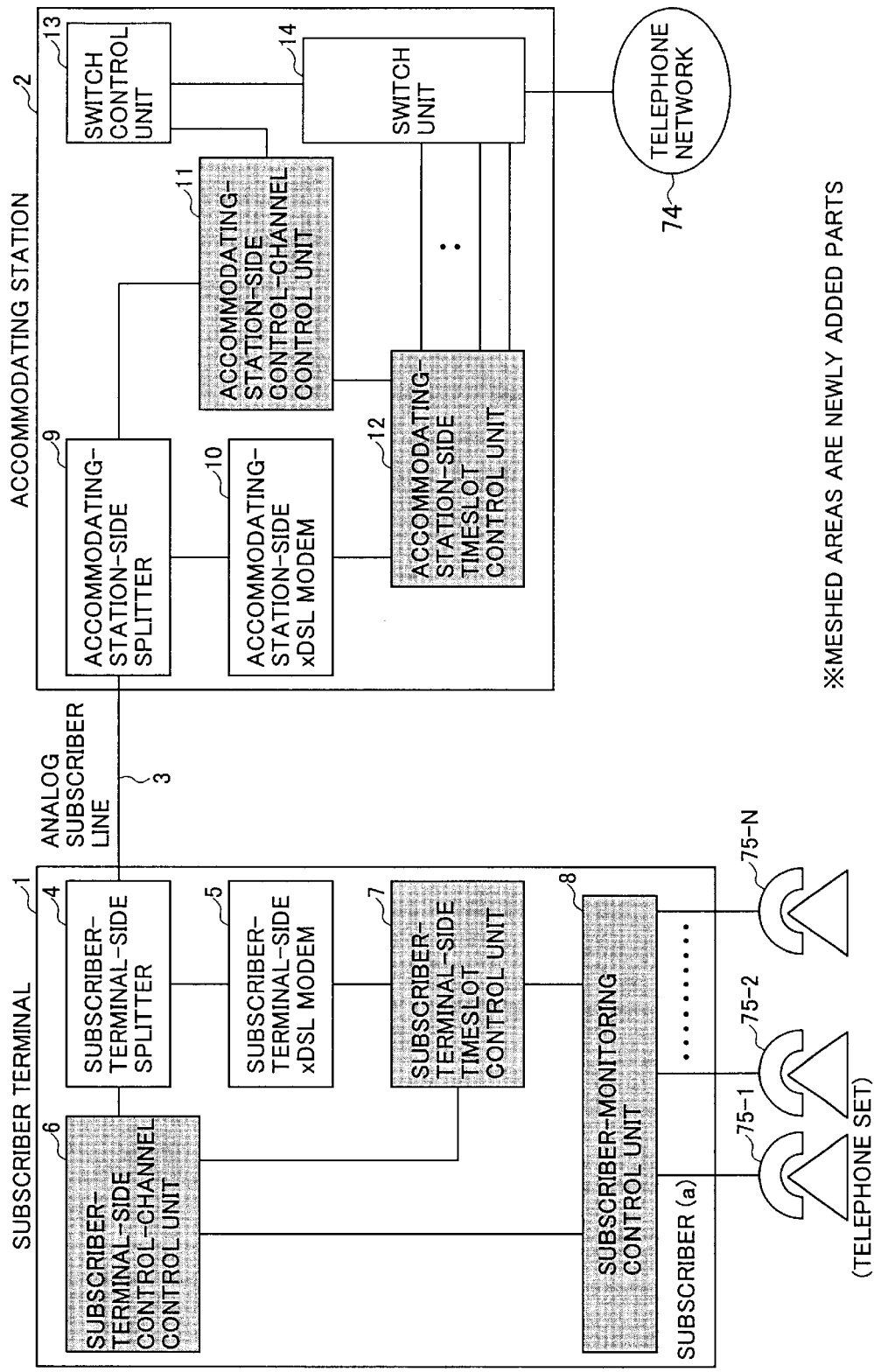
FIG. 3 is a block diagram showing a principle of the present invention.

FIG. 3 shows a block composition of the present invention. A description about each block in FIG. 3 will be given below.

A subscriber terminal 1 is a subscriber-terminal-side accommodating device, and operates as a terminal of actual subscribers. For example, the subscriber terminal 1 is provided at one of a plurality of subscriber's houses. An accommodating station 2 is an accommodating-station-side accommodating device, and is provided in a station (an switch station) that accommodates a plurality of subscribers. An analog subscriber line 3 is an xDSL line connecting the subscriber terminal 1 and the accommodating station 2. The analog subscriber line 3 can be newly constructed, or can be an existing one. Additionally, the analog subscriber line 3 includes a telephone copper line.

The subscriber terminal 1 is composed of a subscriber-terminal-side splitter 4, a subscriber-terminal-side xDSL modem 5, a subscriber-terminal-side control-channel control unit 6, a subscriber-terminal-side timeslot control unit 7 and a subscriber-monitoring control unit 8.

The subscriber-terminal-side splitter 4 separates a signal received from the analog subscriber line 3 into a low-frequency band and a high-frequency band. Additionally, the subscriber-terminal-side splitter 4 combines the low-frequency band and the high-frequency band of a signal, and transmits the signal to the analog subscriber line 3. The subscriber-terminal-side xDSL modem 5 converts a high-frequency analog signal to a digital signal when receiving the analog signal, and converts a digital signal to a high-frequency analog signal when receiving the digital signal.

The subscriber-terminal-side control-channel control unit 6 has the following functions.

(1) The subscriber-terminal-side control-channel control unit 6 receives a voice band of the high-frequency band to be used, and the number of timeslots, by using a control channel transmitted and received by use of the low-frequency band. Subsequently, the subscriber-terminal-side control-channel control unit 6 carries out setting of the voice band, and synchronizes the subscriber terminal 1 and the accommodating station 2.

To synchronize the subscriber terminal 1 and the accommodating station 2 is to match a band used as the voice band and the number of the timeslots between the subscriber terminal 1 and the accommodating station 2.

(2) The subscriber-terminal-side control-channel control unit 6 transmits and receives subscriber information varying dynamically, by use of the control channel transmitted and received by use of the low-frequency band.

(3) The subscriber-terminal-side control-channel control unit 6 notifies the subscriber-terminal-side timeslot control unit 7 to connect a timeslot notified through the control channel that is transmitted and received by use of the low-frequency band, to a subscriber.

(4) The subscriber-terminal-side control-channel control unit 6 requests the subscriber-monitoring control unit 8 to control an operating condition of a subscriber.

Additionally, the subscriber-terminal-side timeslot control unit 7 caries out switching the timeslot notified from the subscriber-terminal-side control-channel control unit 6 to the subscriber, and sets a call line.

Further, the subscriber-monitoring control unit 8 has the following functions.

(1) The subscriber-monitoring control unit 8 monitors a change in a condition of a subscriber, and transmits information about a subscriber whose condition has changed, to the subscriber-terminal-side control-channel control unit 6.

(2) The subscriber-monitoring control unit 8 controls the operating condition of a subscriber, in accordance with notification from the subscriber-terminal-side control-channel control unit 6.

The accommodating station 2 is composed of an accommodating-station-side splitter 9, an accommodating-station-side xDSL modem 10, an accommodating-station-side control-channel control unit 11, an accommodating-station-side timeslot control unit 12, a switch control unit 13 and a switch unit 14.

The accommodating-station-side splitter 9 separates a signal received from the analog subscriber line 3 into the low-frequency band and the high-frequency band. Additionally, the accommodating-station-side combines the low-frequency band and the high-frequency band of a signal, and transmits the signal to the analog subscriber line 3. The accommodating-station-side xDSL modem 10 converts a high-frequency analog signal to a digital signal when receiving the analog signal, and converts a digital signal to a high-frequency analog signal when receiving the digital signal.

The accommodating-station-side control-channel control unit 11 has the following functions.

(1) The accommodating-station-side control-channel control unit 11 determines a high-frequency band used as a voice band and the number of timeslots, and enables usage of the high-frequency band as the voice band.

(2) The accommodating-station-side control-channel control unit 11 synchronizes the subscriber terminal 1 and the accommodating station 2, by notifying the high-frequency band used as the voice band and the number of the timeslots to the subscriber terminal 1, by use of the control channel that is transmitted and received by the low-frequency band.

(3) The accommodating-station-side control-channel control unit 11 determines a high-frequency band used as the voice band and the number of the timeslots again during a situation in which no communication is performed. Subsequently, the accommodating-station-side control-channel control unit 11 notifies the subscriber terminal 1 about the determined voice band and number of the timeslots, and synchronizes the subscriber terminal 1 and the accommodating station 2, again.

(4) The accommodating-station-side control-channel control unit 11 carries out management of availability of a timeslot, and allocation of the timeslot to a subscriber. Additionally, the accommodating-station-side control-channel control unit 11 notifies the subscriber terminal 1 about a number of the allocated timeslot, by using the accommodating-station-side timeslot control unit 12 and the control channel transmitted and received by use of the low-frequency band.

(5) The accommodating-station-side control-channel control unit 11 controls the operating condition of a subscriber, and notifies the subscriber terminal 1 about the operating condition.

The accommodating-station-side timeslot control unit 12 carries out switching between the timeslot notified from the accommodating-station-side control-channel control unit 11 and a timeslot used at the switch unit 14. The switch control unit 13 carries out switch control (time-division switching control) of a related-art switching system. The switch unit 14 carries out switching (time-division switching) of a subscriber by following an instruction from the switch control unit 13.

A description will now be given of a principle of the present invention by using FIG. 3.

(Start up of the Subscriber Terminal 1)

At a time of starting up the subscriber terminal 1 shown in FIG. 3, the subscriber-terminal-side control-channel control unit 6 transmits a request for notifying a high-frequency band used as the voice band, to the accommodating-station-side control-channel control unit 11 via the subscriber-terminal-side splitter 4, the analog subscriber line 3 and the accommodating-station-side splitter 9. The accommodating-station-side control-channel control unit 11 determines allocation of the voice band of the high-frequency band and the number of the timeslots. The accommodating-station-side timeslot control unit 12 divides the voice band converted to a digital signal by the accommodating-station-side xDSL modem 10 into the timeslots, based on information about the allocation of the voice band of the high-frequency band and the number of the timeslots, and, then, uses the timeslots for voice.

Additionally, the accommodating-station-side control-channel control unit 11 transmits the determined allocation of the voice band and number of the timeslots to the subscriber-terminal-side control-channel control unit 6, via the accommodating-station-side splitter 9, the analog subscriber line 3 and the subscriber-terminal-side splitter 4, by using the control channel. The subscriber-terminal-side control-channel control unit 6 notifies the subscriber-terminal-side timeslot control unit 7 about usage of the notified voice band and number of the timeslots. The subscriber-terminal-side timeslot control unit 7 divides the voice band converted to a digital signal by the subscriber-terminal-side xDSL modem 5 based on notified information, into the timeslots, and uses the timeslots for voice. According to this process, recognition of a band used as the voice band and the number of the timeslots can be matched at the subscriber terminal 1 and the accommodating station 2.

(Call Out from a Subscriber)

In a case in which the subscriber-monitoring control unit 8 has detected a call out from a subscriber (a), the subscriber-monitoring control unit 8 notifies information about the subscriber (a) to the subscriber-terminal-side control-channel control unit 6. The subscriber-terminal-side control-channel control unit 6 transmits a request for allocating a timeslot to the subscriber (a) and notification that a condition of the subscriber (a) has changed from an on-hook condition to off-hook condition, to the accommodating-station-side control-channel control unit 11, via the subscriber-terminal-side splitter 4, the analog subscriber line 3 and the accommodating-station-side splitter 9, by using the control channel.

(Re-recognition of a Used Band and the Number of the Timeslots)

The accommodating-station-side control-channel control unit 11 checks whether all the subscribers are in a condition in which no communication is performed. In a case in which all the subscribers are in the condition in which no communication is performed, the accommodating-station-side control-channel control unit 11 determines allocation of the voice band used as the high-frequency band and the number of the timeslots again, and transmits a result to the subscriber-terminal-side control-channel control unit 6 via the accommodating-station-side splitter 9, analog subscriber line 3 and the subscriber-terminal-side splitter 4.

The subscriber-terminal-side control-channel control unit 6 notifies the subscriber-terminal-side timeslot control unit 7 about the notified voice band and number of the timeslots. The subscriber-terminal-side timeslots control unit 7 divides the voice band converted to a digital signal by the subscriber-terminal-side xDSL modem 5 based on notified information, into the timeslots, and, then, uses the timeslots for voice. According to this process, recognition of the band used as the voice band and the number of the timeslots can be adjusted between the subscriber terminal 1 and the accommodating station 2.

Accordingly, a used xDSL line can be appropriately altered in accordance with a quality of a line.

(Line Connection)

The subscriber-terminal-side control-channel control unit 6 notifies the accommodating-station-side control-channel control unit 11 that the recognition of the voice band and the number of the timeslots has matched, via the subscriber-terminal-side splitter 4, the analog subscriber line 3 and the accommodating-station-side splitter 9, by using the control channel.

After receiving the notification, the accommodating-station-side control-channel control unit 11 notifies the switch control unit 13 that the subscriber (a) has called out. Subsequently, the switch control unit 13 obtains data about a destination timeslot number (a timeslot number of a destination telephone set in a general telephone network) of the switch unit 14. Additionally, the accommodating-station-side control-channel control unit 11 allocates a timeslot on a side of an analog subscriber line, and notifies the accommodating-station-side timeslot control unit 12 about a result of allocating the timeslot on the side of the analog subscriber line with the destination timeslot number.

The accommodating-station-side timeslot control unit 12 connects the notified destination timeslot with the timeslot on the side of the analog subscriber line. The accommodating-station-side control-channel control unit 11 transmits the result of allocating the timeslot on the side of the analog subscriber line, to the subscriber-terminal-side control-channel control unit 6, via the accommodating-station-side splitter 9, the analog subscriber line 3 and the subscriber-terminal-side splitter 4, by using the control channel. The subscriber-terminal-side control-channel control unit 6 receives timeslot data allocated for the subscriber (a), and notifies the subscriber-terminal-side timeslot control unit 7 about the timeslot data.

The subscriber-terminal-side timeslot control unit 7 connects the timeslot notified from the subscriber-terminal-side control-channel control unit 6 with the subscriber (a). As a result, a specific timeslot is connected to the subscriber (a), and communication is enabled.

(Call Reception to a Subscriber)

Next, a description will be given of a case in which a call is received at the subscriber (a). In the case in which the call is received at the subscriber (a), the switch control unit 13 notifies the switch unit 14 and the accommodating-station-side control-channel control unit 11 about the call reception and a destination timeslot number (a timeslot number of a call-originating telephone set in the general telephone network). The accommodating-station-side control-channel control unit 11 having received the notification allocates a timeslot on the side of the analog subscriber line, and notifies the accommodating-station-side timeslot control unit 12 about a result of allocating the timeslot on the side of the analog subscriber line with the destination timeslot number. The accommodating-station-side timeslot control unit 12 the notified destination timeslot with the notified timeslot on the side of the analog subscriber line.

Additionally, the accommodating-station-side control-channel control unit 11 notifies the subscriber-terminal-side control-channel control unit 6 about the result of allocating the timeslot on the side of the analog subscriber line and the call reception at the subscriber (a), via the accommodating-station-side splitter 9, the analog subscriber line 3 and the subscriber-terminal-side splitter 4, by using the control channel.

The subscriber-terminal-side control-channel control unit 6 receives timeslot data allocated to the subscriber (a), and notifies the subscriber-terminal-side timeslot control unit 7 about the timeslot data. The subscriber-terminal-side timeslot control unit 7 connects the timeslot notified from the subscriber-terminal-side control-channel control unit 6 with the subscriber (a).

As a result, the timeslot is connected to the subscriber (a), and communication is enabled between the subscriber (a) and a call-originating device.

As described above, a timeslot is allocated only when a subscriber carries out communication, and is not necessarily connected to the subscriber all the time. Accordingly, the number of analog telephone subscribers who can be allocated is greater than the number of usable timeslots.

(An External Control of an Operating Condition of a Subscriber)

In a case in which a command to the subscriber (a) is inputted from an external consol to the subscriber terminal 1, the subscriber-terminal-side control-channel control unit 6 transmits command input information to the accommodating-station-side control-channel control unit 11, via the subscriber-terminal-side splitter 4, the analog subscriber line 3 and the accommodating-station-side splitter 9, by using the control channel. The accommodating-station-side control-channel control unit 11 controls the subscriber (a) based on the transmitted command information.

In a case in which a command to the subscriber (a) is inputted from the external consol to the accommodating station 2, the accommodating-station-side control-channel control unit 11 transmits command input information to the subscriber-terminal-side control-channel control unit 6, via the accommodating-station-side splitter 9, the analog subscriber line 3 and the subscriber-terminal-side splitter 4, by using the control channel. The subscriber-terminal-side control-channel control unit 6 analyzes the received information, and transmits information to the subscriber-monitoring control unit 8. The subscriber-monitoring control unit 8 controls the subscriber (a) based on the transmitted information.

A detailed description will now be given of the present invention.

(A First Embodiment)

Figure 4:
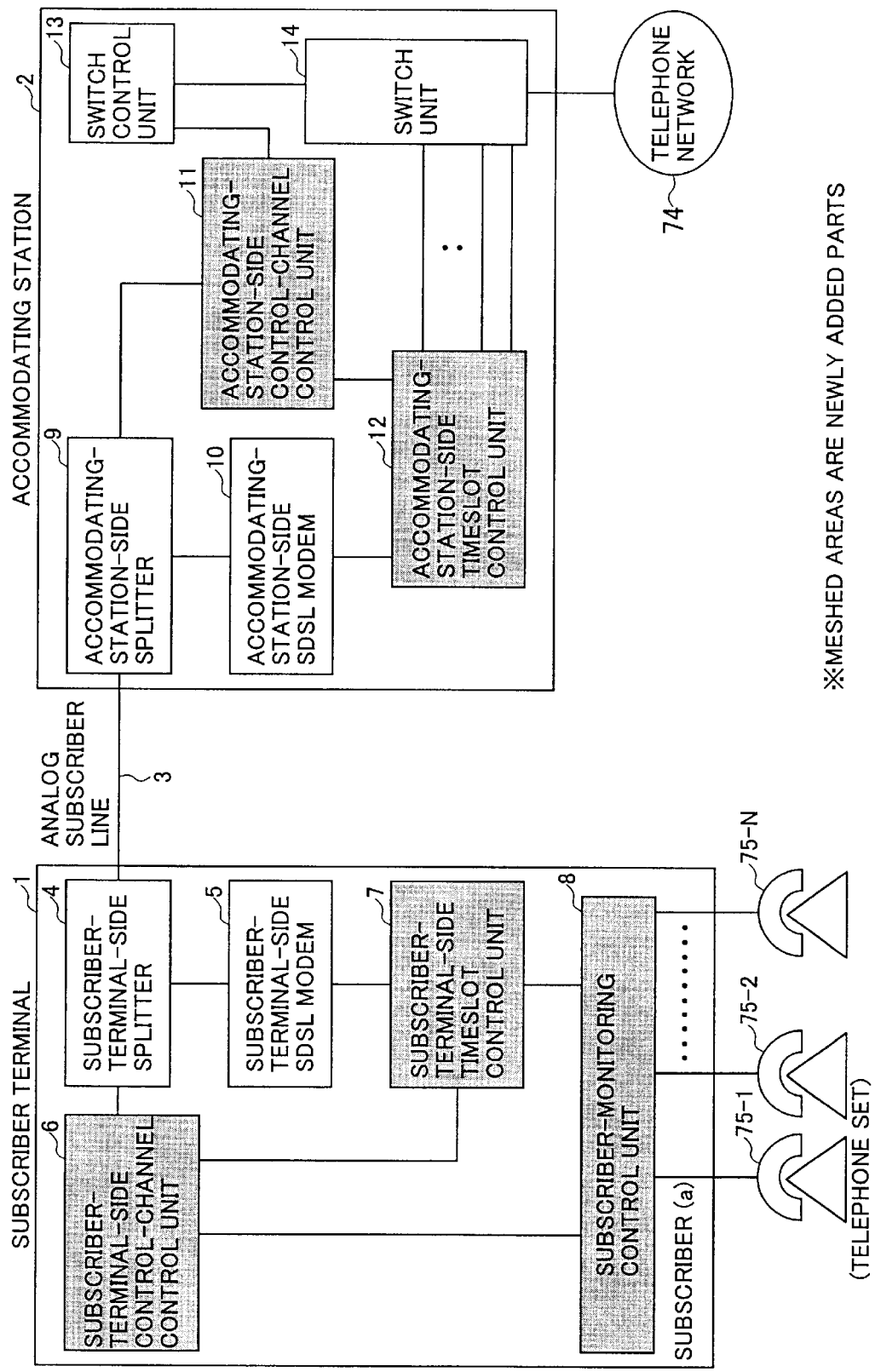
FIG. 4 is a block diagram showing a first embodiment using an SDSL modem.
Figure 5:
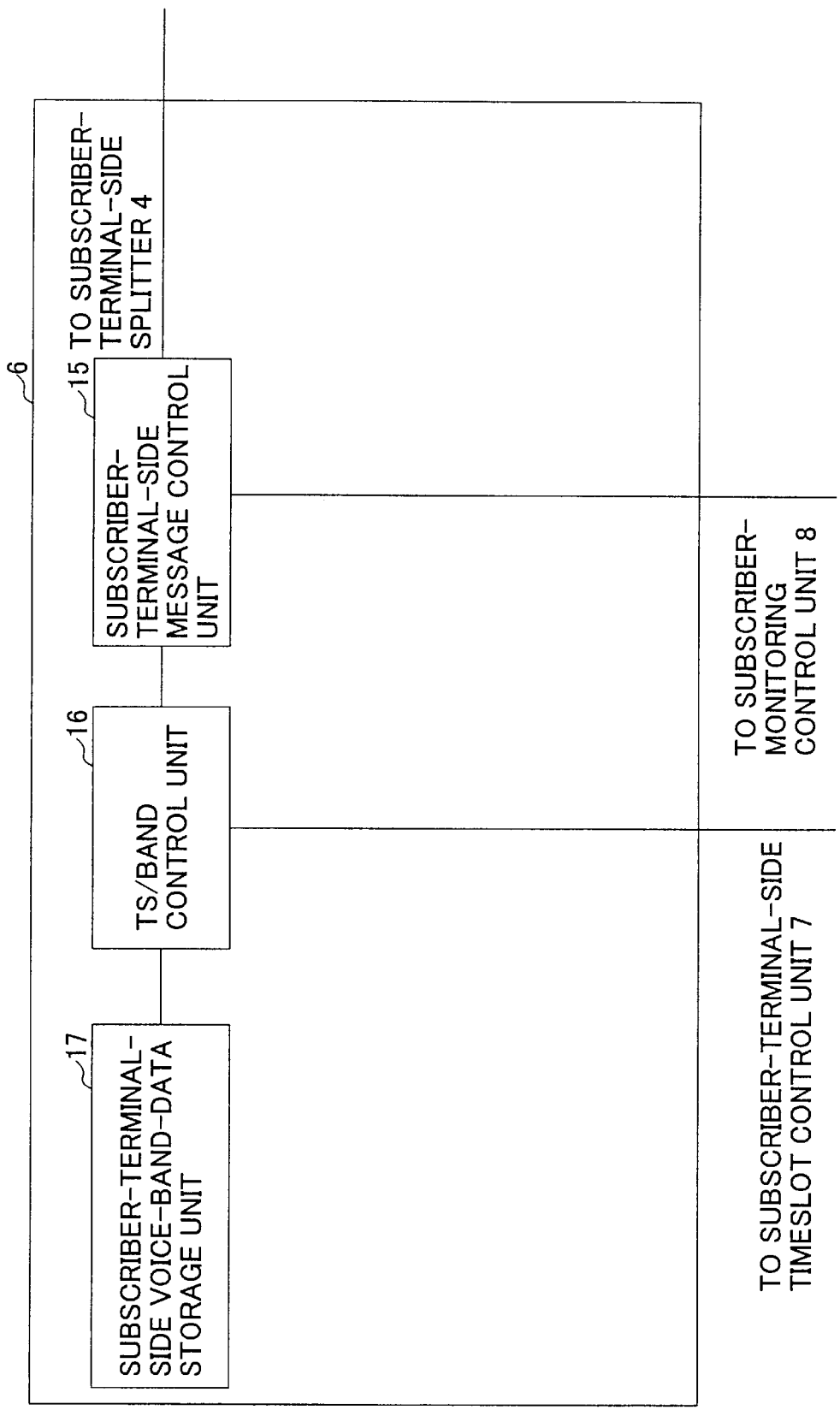
FIG. 5 is a block diagram showing an example of a composition of a subscriber-terminal-side control-channel control unit according to the first embodiment.

FIG. 4 is a block diagram showing an embodiment using an SDSL modem. FIG. 5 is an example of a block composition of the subscriber-terminal-side control-channel control unit 6. A description will be given of each unit below.

A subscriber-terminal-side message control unit 15 analyzes a message that is received by using the control channel, and edits a message that is to be transmitted by using the control channel. A TS/band control unit 16 manages a timeslot assigned to a subscriber. A subscriber-terminal-side voice-band-data storage unit 17 stores voice-band data for notifying a modem and the like about a voice band and the number of timeslots, by setting a band used as the voice band and the number of the timeslots.

Figure 6:
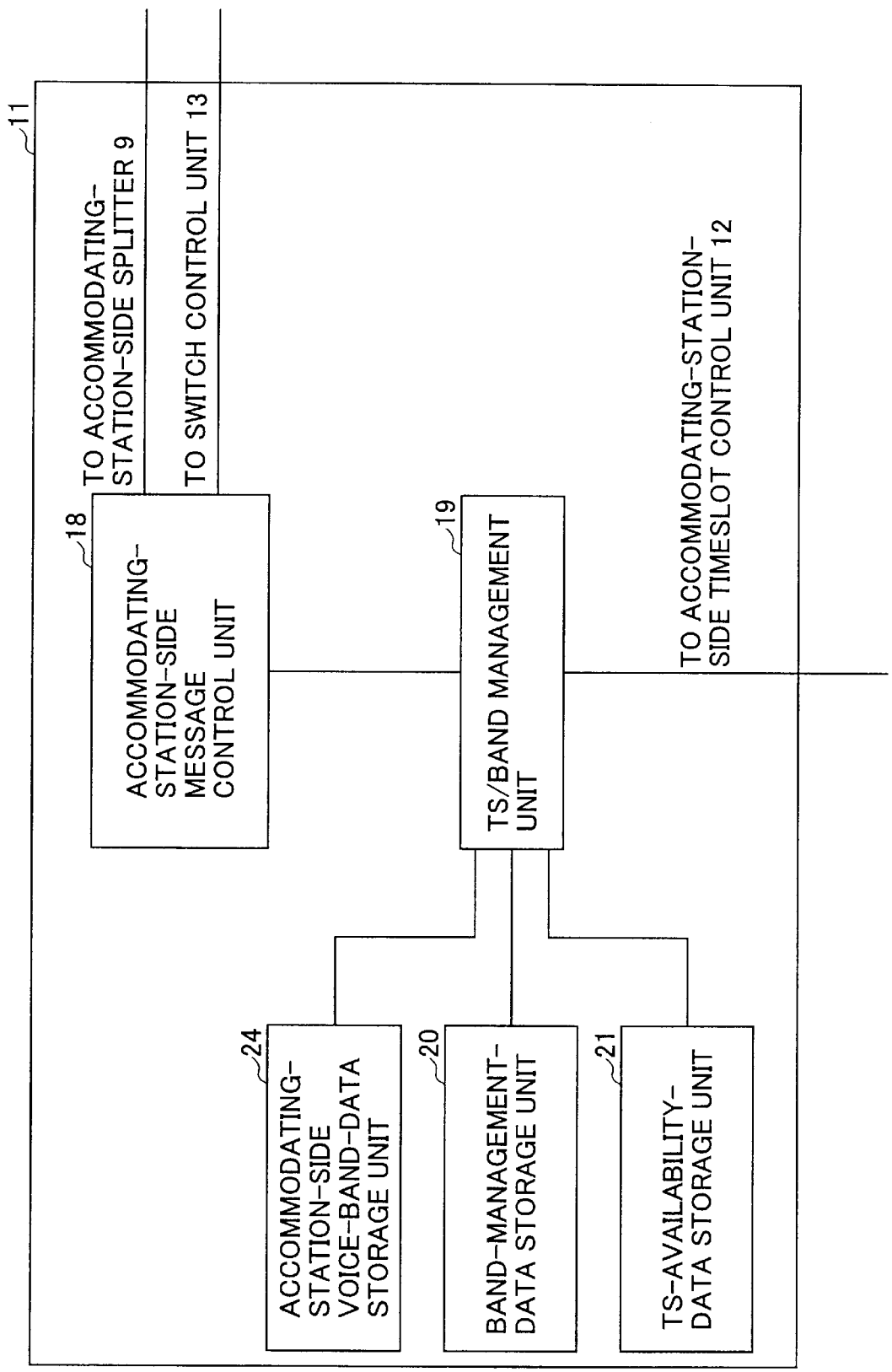
FIG. 6 is a block diagram showing an example of a composition of an accommodating-station-side control-channel control unit according to the first embodiment.

FIG. 6 is an example of a block composition of the accommodating-station-side control-channel control unit 11. A description will be given of each block below.

An accommodating-station-side message control unit 18 analyzes a message received from the switch control unit 13 and a message received by use of the control channel, and edits a message to be transmitted. A TS/band management unit 19 manages a high-frequency band used as the voice band and a timeslot assigned to a subscriber. A band-management-data storage unit 20 stores band-management data that indicates an upward band and a downward band used by the SDSL. This data is defined by hardware such as an xDSL modem. A TS-availability-data storage unit 21 stores TS-availability data for managing availability of a timeslot. An accommodating-station-side voice-band-data storage unit 24 stores voice-band data for notifying the voice band and the number of timeslots to a modem and the like, by setting a band used as the voice band and the number of the timeslots.

Figure 7:
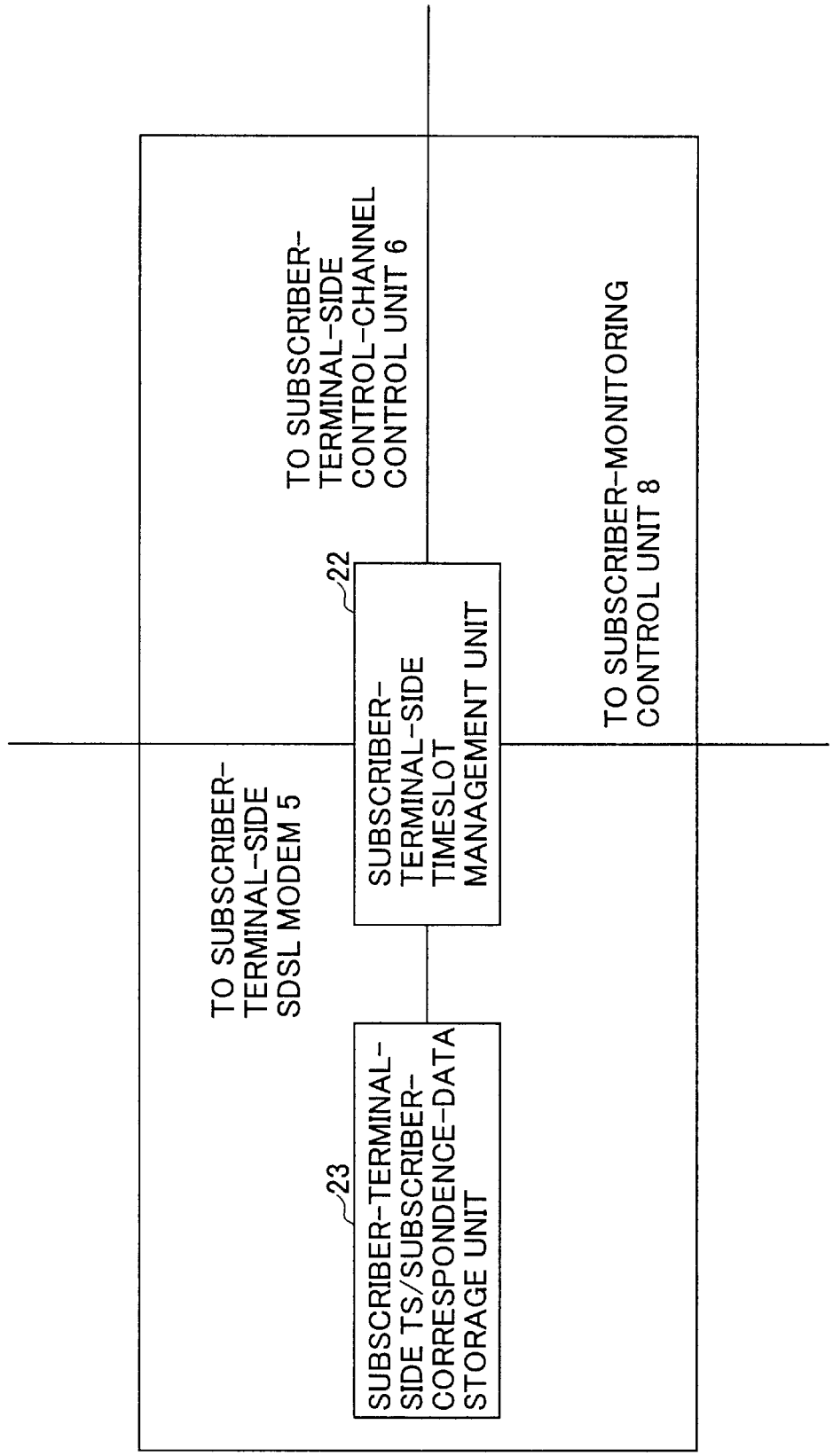
FIG. 7 is a block diagram showing an example of a composition of a subscriber-terminal-side timeslot control unit.

FIG. 7 is an example of a block composition of the subscriber-terminal-side timeslot control unit 7. A description will be given of each unit below.

A subscriber-terminal-side timeslot management unit 22 connects a timeslot to a subscriber. A subscriber-terminal-side TS/subscriber-correspondence-data storage unit 23 stores TS/subscriber correspondence data that makes a subscriber correspond to a timeslot used by the subscriber.

Figure 8:
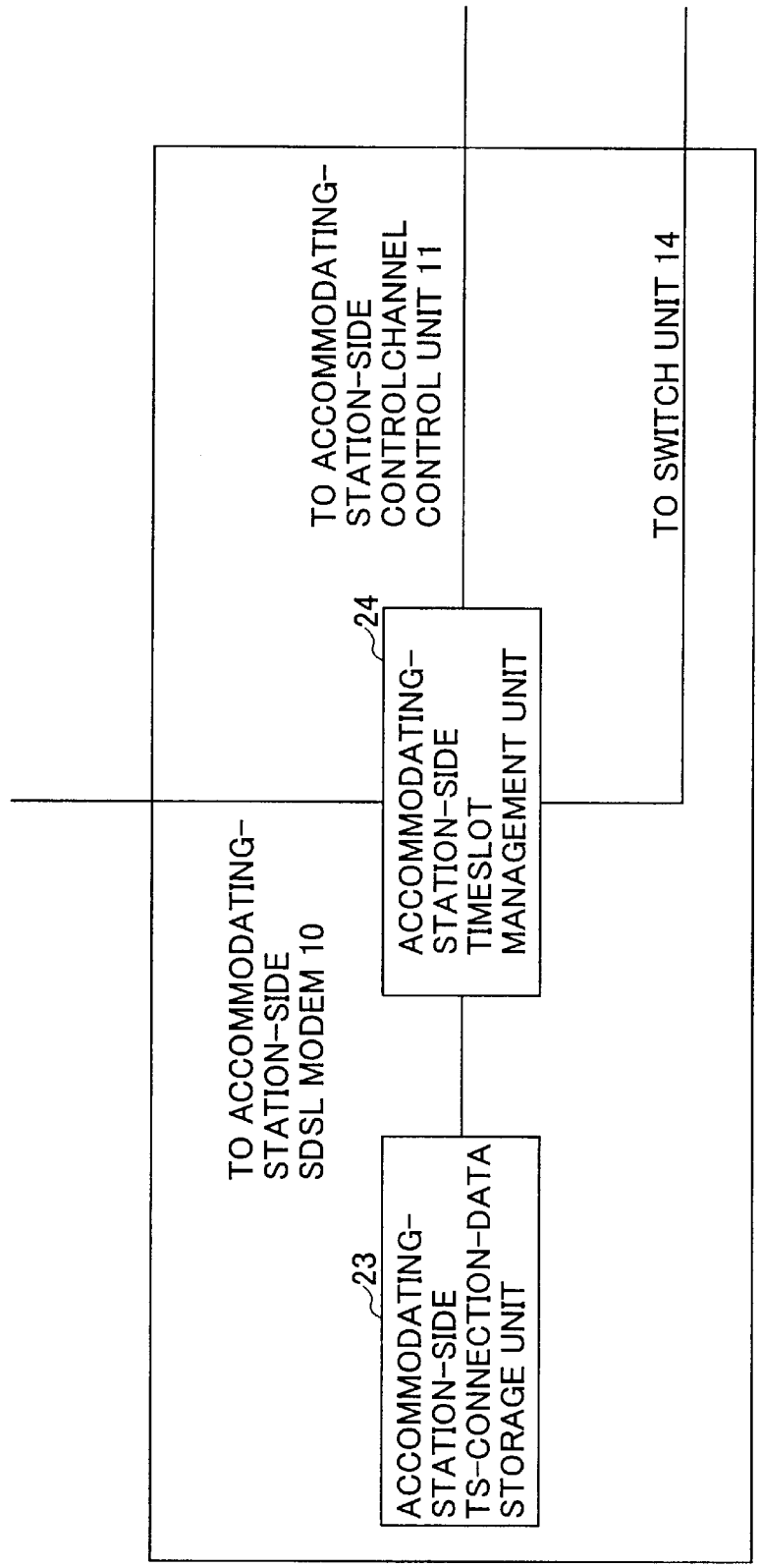
FIG. 8 is a block diagram showing an example of a composition of an accommodating-station-side timeslot control unit.

FIG. 8 is an example of a block composition of the accommodating-station-side timeslot control unit 12.

An accommodating-station-side timeslot management unit 22 connects a timeslot to a subscriber. An accommodating-station-side TS-connection-data storage unit 23 stores TS connection data for connecting a timeslot of the switch unit 14 with a timeslot of the side of the analog subscriber line.

A description will be given of the first embodiment of the present invention below, by using FIGS. 4 through 30.

(Start up of the Subscriber Terminal 1)

Figure 9:
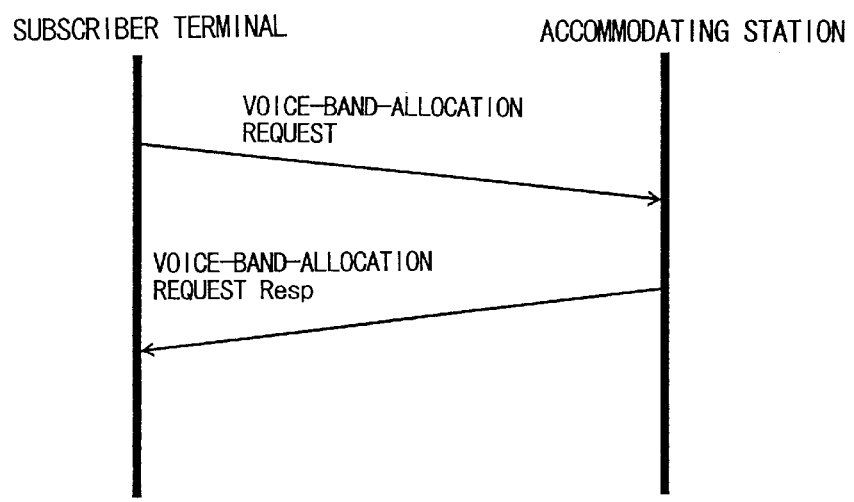
FIG. 9 is a diagram showing an example of a sequence to allocate a voice band at a time of starting up.

FIG. 9 shows an example of a sequence at the start up.

A plurality of the subscriber terminals 1 are provided for the accommodating station 2. When one of the subscriber terminals 1 starts up, the subscriber terminal 1 transmits a voice-band-allocation request message shown in FIG. 12 to the accommodating station 2. In response to the voice-band-allocation request message, the accommodating station 2 returns a voice-band-allocation-request response message shown in FIG. 13 to the subscriber terminal 1.

A detailed description will be given of voice-band allocation when the subscriber terminal 1 starts up, as follows. When the subscriber terminal 1 starts up, the subscriber-terminal-side control-channel control unit 6 requests the accommodating station 2 by using a message format shown in FIG. 12 through the control channel for notification of a high-frequency band used as the voice band. The message is transmitted to the accommodating-station-side control-channel control unit 11 by the control channel, via the subscriber-terminal-side splitter 4, the analog subscriber line 3 and the accommodating-station-side splitter 9.

The accommodating-station-side message control unit 18 in the accommodating-station-side control-channel control unit 11 analyzes the received message, and requests the TS/band management unit 19 for the voice-band allocation. The TS/band management unit 19 reads out upward-band (1550 Kbps) data of the accommodating-station-side SDSL modem 10 from the band-management-data storage unit 20 set by the accommodating-station-side SDSL modem 10. Subsequently, the TS/band management unit 19 acquires a voice band 1536 Kbps and the number 24 of timeslots to be used that satisfy the following equations.

An SDSL upward high-frequency band$>=64$ Kbps$\times$n(the number of timeslots) ("n" is the highest number that satisfies the left conditional equation)

A voice band=64 Kbps$\times n$

Additionally, the TS/band management unit 19 sets the voice band 1536 Kbps and the number 24 of the timeslots to be used, to the accommodating-station-side voice-band-data storage unit 24, and notifies the accommodating-station-side SDSL modem 10 about a communication rate of the voice band. Additionally, the TS/band management unit 19 sets the number 24 of the timeslots, and 1 (empty) to data corresponding to TS numbers 1 through 24, in the TS-availability-data storage unit 21. The TS/band management unit 19 notifies the accommodating-station-side message control unit 18 about the determined voice band (1536 Kbps) and the number 24 of the timeslots. The accommodating-station-side message control unit 18 transmits the voice band 1536 Kbps and the number 24 of the timeslots to the subscriber-terminal-side control-channel control unit 6 by using a message format shown in FIG. 13, via the accommodating-station-side splitter 9, the analog subscriber line 3 and the subscriber-terminal-side splitter 4.

The subscriber-terminal-side message control unit 15 in the subscriber-terminal-side control-channel control unit 6 analyzes the received message, and notifies the TS/band control unit 16 about the voice band and the number of the timeslots. The subscriber-terminal-side TS/band control unit 16 sets the notified voice band 1536 Kbps and number 24 of the timeslots to the subscriber-terminal-side voice-band-data storage unit 17, and notifies the subscriber-terminal-side SDSL modem 5 about a communication rate of a high-frequency band.

According to the above-described processes, recognition of a band used as the voice band and the number of the timeslots can be matched between the subscriber terminal 1 and the accommodating station 2.

Figure 25:
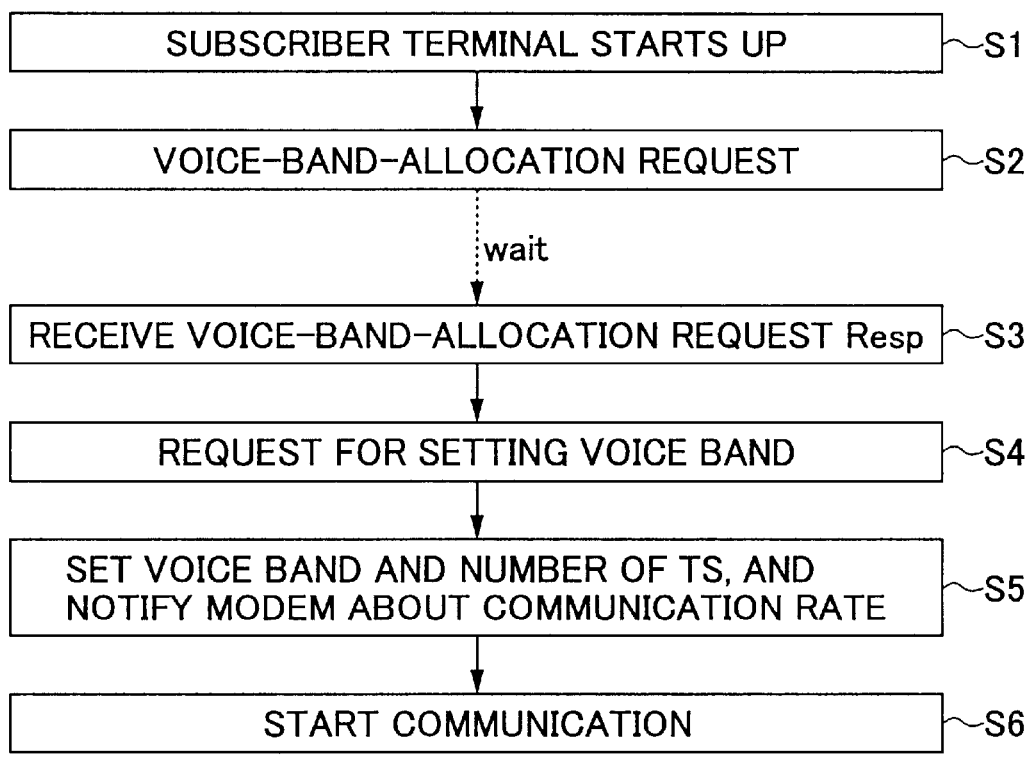
FIG. 25 is a flowchart showing an example of a process carried out by a subscriber terminal at a time of starting up the subscriber terminal.

FIG. 25 is an example of a subscriber-terminal-side process flow when the subscriber terminal 1 starts up. A description will sequentially be given of the subscriber-terminal-side process, along with FIG. 25.

S1: The subscriber terminal starts up.

S2: The subscriber-terminal-side message control unit 15 in the subscriber-terminal-side control-channel control unit 6 edits a voice-band-allocation request, and transmits the voice-band allocation request to the accommodating station 2.

S3: Subscriber-terminal-side message control unit 15 receives a voice-band-allocation-request response message.

S4: The subscriber-terminal-side message control unit 15 in the subscriber-terminal-side control-channel control unit 6 requests the TS/band control unit 16 for setting the voice band.

S5: The TS/band control unit 16 sets the voice band 1536 Kbps and the number 24 of the timeslots notified to the subscriber-terminal-side voice-band-data storage unit 17.

S6: The subscriber-terminal-side SDSL modem 5 starts communication at 1536 Kbps.

Figure 26:
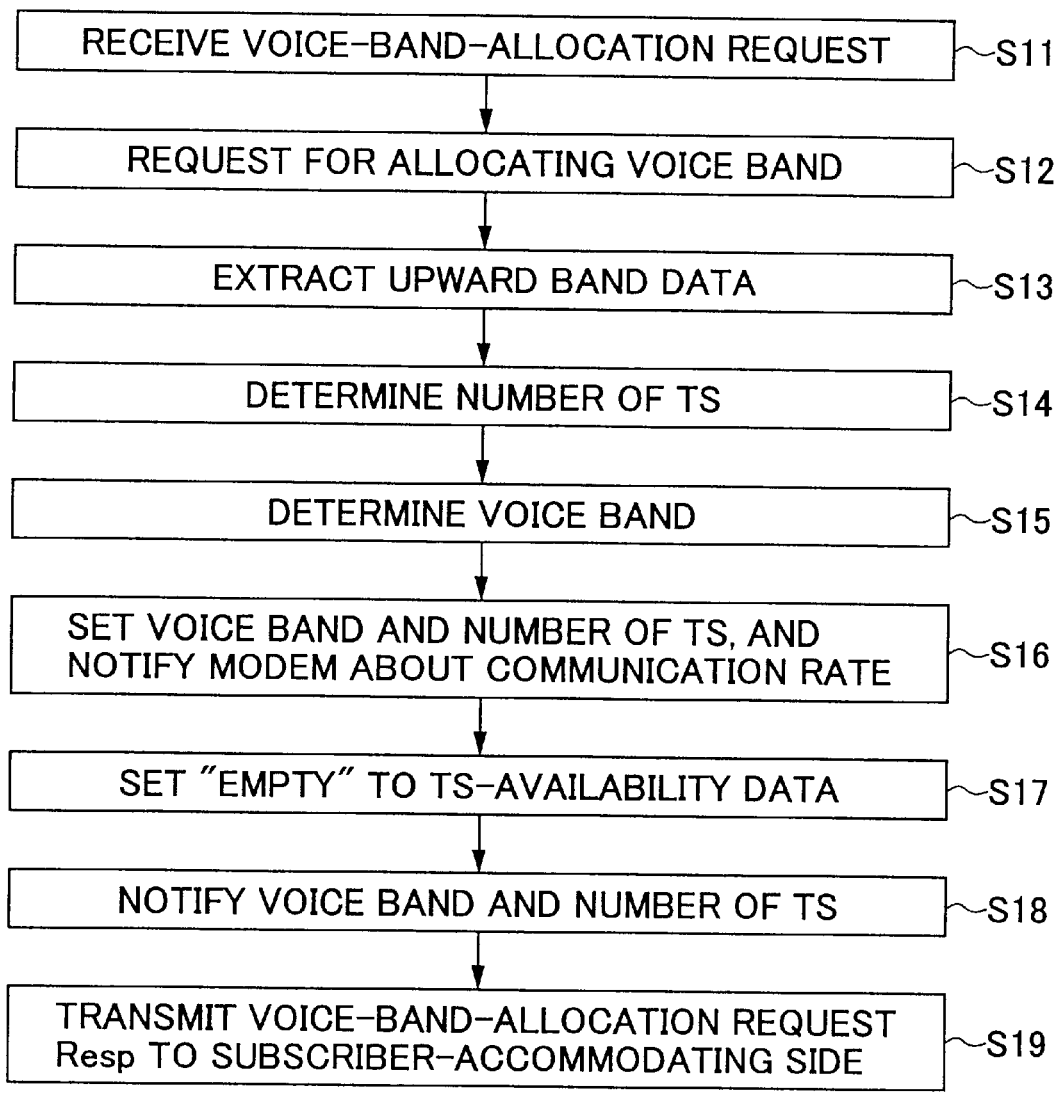
FIG. 26 is a flowchart showing an example of a process carried out by an accommodating station at the time of starting up the subscriber terminal.

FIG. 26 is an example of an accommodating-station-side process flow when the subscriber terminal starts up. A description will sequentially be given of a process carried out by the accommodating station 2, along with FIG. 26.

S11: The accommodating-station-side message control unit 18 in the accommodating-station-side control-channel control unit 11 receives the voice-band-allocation request message.

S12: The accommodating-station-side message control unit 18 in the accommodating-station-side control-channel control unit 11 requests the TS/band management unit 19 for allocating the voice band.

S13: The TS/band management unit 19 reads out the upward band data 1550 Kbps from the band-management-data storage unit 20 set by the accommodating-station-side SDSL modem 10.

S14: The TS/band management unit 19 determines the highest value n=24 that satisfies a conditional equation 1550 Kbps$>=64$ Kbps$\times$n as the number of the timeslots.

S15: The TS/band management unit 19 determines 64 Kbps$\times 24=1536$ Kbps as the voice band.

S16: The TS/band management unit 19 sets the calculated number 24 of the timeslots and band data 1536 Kbps to the accommodating-station-side voice-band-data storage unit 24, and notifies the accommodating-station-side SDSL modem 10 about a communication rate of the voice band.

S17: The TS/band management unit 19 sets the number 24 of the timeslots, and 1 (empty) to bits corresponding to the TS numbers 1 through 24, in the TS-availability-data storage unit 21.

S18: The TS/band management unit 19 notifies the accommodating-station-side message control unit 18 about the voice band 1536 Kbps and the number 24 of the timeslots.

S19: The accommodating-station-side message control unit 18 sets the voice band 1536 Kbps and the number 24 of the timeslots to a voice-band-allocation request response, and transmits the voice-band-allocation request response to the subscriber-accommodating side 1.

(Call Out from a Subscriber)

Figure 10:
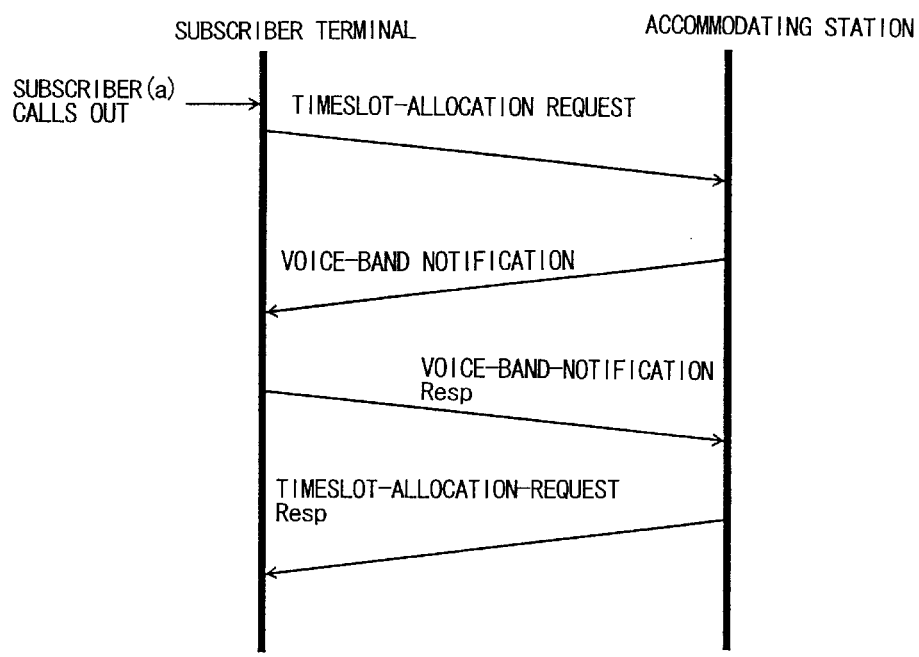
FIG. 10 is a diagram showing an example of a sequence at a time of calling out.

FIG. 10 is an example of a sequence when the subscriber (a) calls out.

Figure 16:
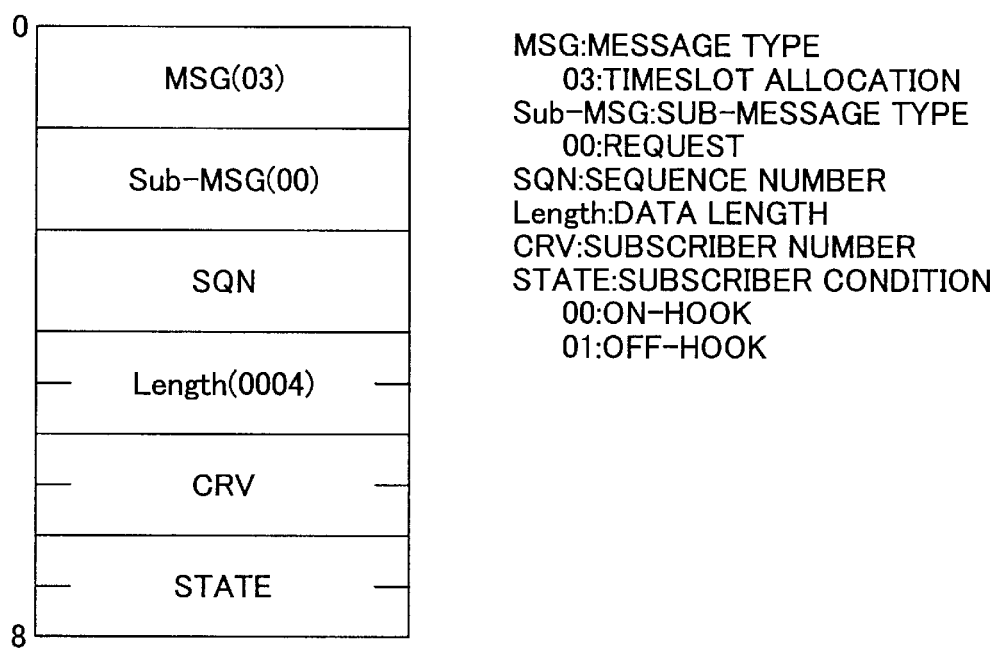
FIG. 16 is a diagram showing an example of a format of a timeslot-allocation request.
Figure 17:
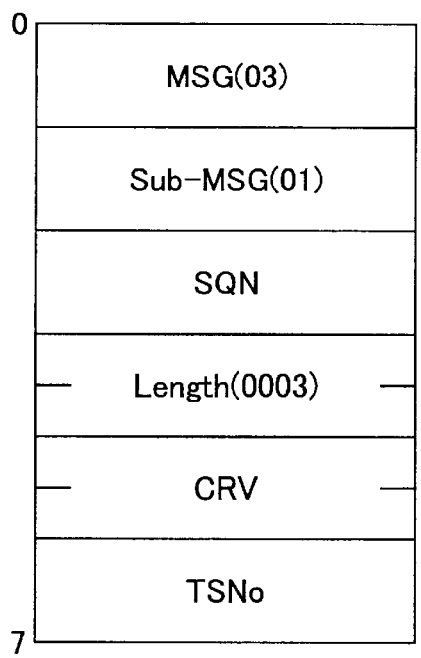
FIG. 17 is a diagram showing an example of a format of a timeslot-allocation-request response.
Figure 18:
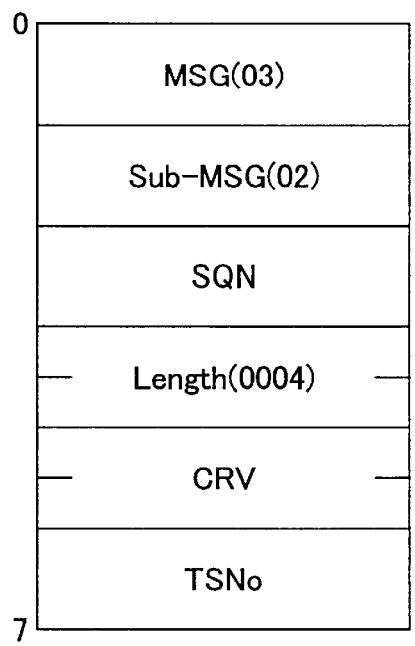
FIG. 18 is a diagram showing an example of a format of a timeslot-allocation notification.
Figure 19:
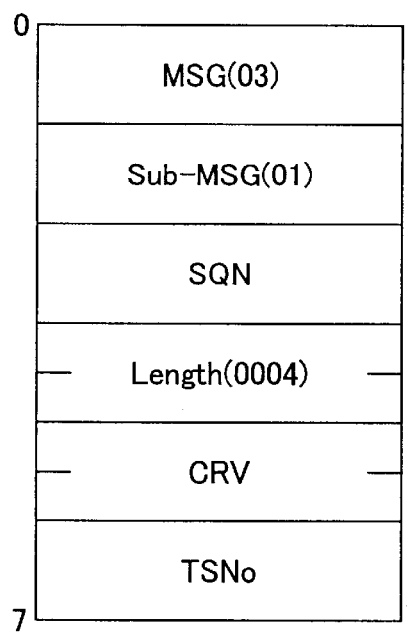
FIG. 19 is a diagram showing an example of a format of a timeslot-allocation-notification response.
Figure 20:
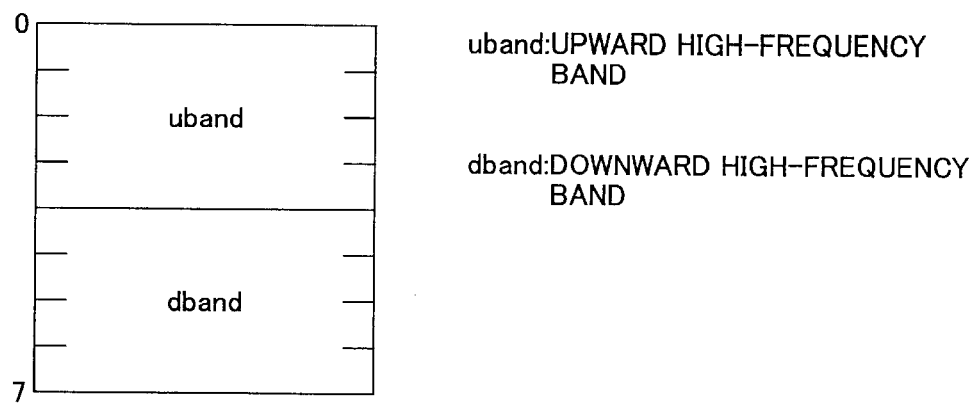
FIG. 20 is a diagram showing an example of a format of band-management data.
Figure 21:
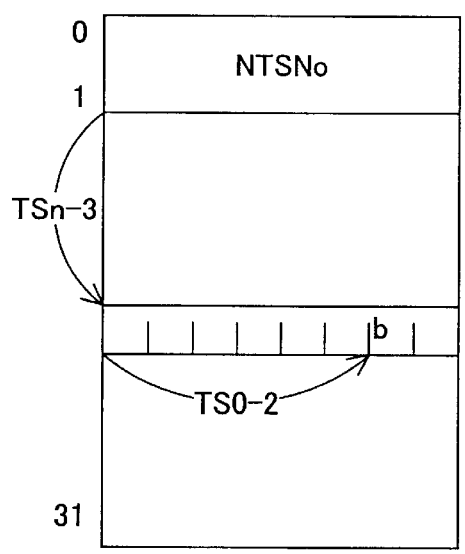
FIG. 21 is a diagram showing an example of a format of timeslot (TS) availability data.
Figure 22:
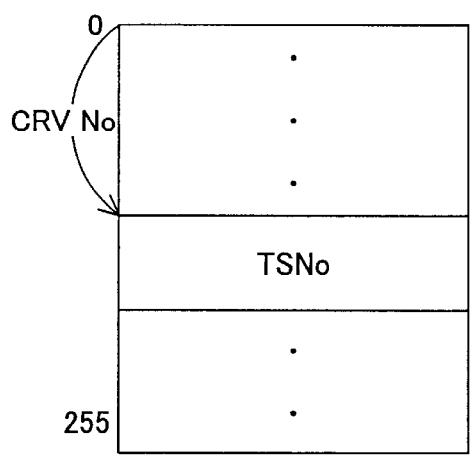
FIG. 22 is a diagram showing an example of a format of timeslot/subscriber correspondence data.
Figure 23:
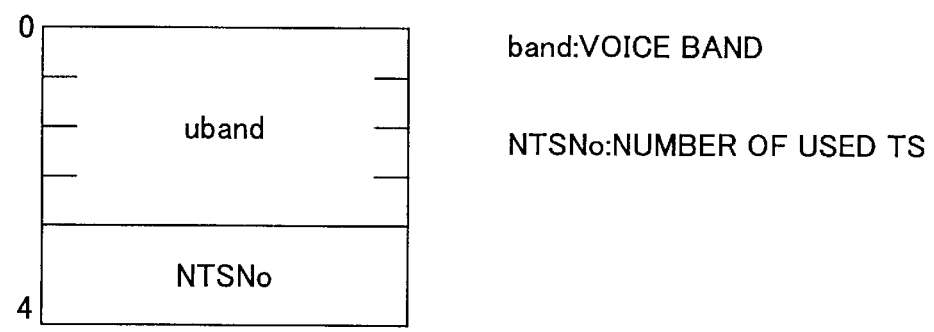
FIG. 23 is a diagram showing an example of a format of voice-band data.
Figure 24:
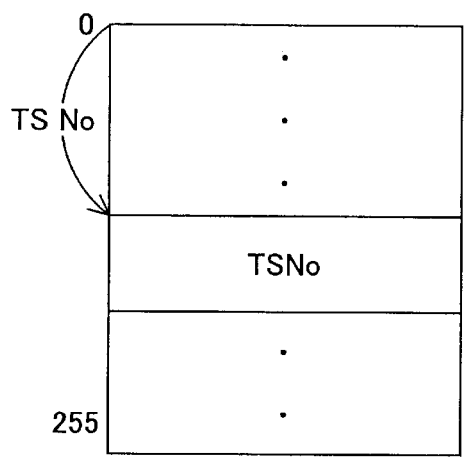
FIG. 24 is a diagram showing an example of a format of accommodating-station-side timeslot connection data.

When the subscriber (a) calls out, the subscriber terminal 1 transmits a timeslot-allocation request message shown in FIG. 16 to the accommodating station 2. In response to the timeslot-allocation request message, the accommodating station 2 confirms the voice band to be used, and transmits a voice-band notification message shown in FIG. 14 to the subscriber terminal 1. The subscriber terminal 1 matches a voice-band-notification response message shown in FIG. 15, and returns the voice-band-notification response message. The accommodating station 2 receives the voice-band-notification response message, and, then, transmits a timeslot-allocation-request response message shown in FIG. 17 to the subscriber terminal 1.

The case in which the accommodating station 2 transmits the voice-band notification message to the subscriber terminal 1 is a case in which no communication is performed, and a used band and the number of timeslots are different from settings at the rime of starting up the subscriber terminal 1.

A detailed description will now be given of a process performed when a subscriber calls out. After completion of starting up the subscriber terminal 1, the subscriber (a) accommodated by the subscriber terminal 1 calls out. The subscriber-monitoring control unit 8 notifies the subscriber-terminal-side control-channel control unit 6 the subscriber (a) has called out. Consequently, the subscriber terminal 1 notifies the accommodating station 2 about a condition change from an on-hook state of the subscriber (a) to an off-hook state of the subscriber (a), by using the control channel.

The timeslot-allocation request message is transmitted from the subscriber terminal 1 to the accommodating-station-side control-channel control unit 11, via the subscriber-terminal-side splitter 4, the analog subscriber line 3 and the accommodating-station-side splitter 9. The accommodating-station-side message control unit 18 in the accommodating-station-side control-channel control unit 11 requests the TS/band management unit 19 for allocating timeslots. The TS/band management unit 19 checks the TS-availability-data storage unit 21, and compares accommodating-station-side voice-band data in the accommodating-station-side voice-band-data storage unit 24 with an upward band of band-management data in the band-management-data storage unit 20 in a case in which all the timeslots are empty (when no communication is performed).

In a case in which the accommodating-station-side voice-band data in the accommodating-station-side voice-band-data storage unit 24 is 1536 Kbps, and an upward band of the SDSL modem 10, that is, the rage-management data in the band-management-data storage unit 20, is 1350 Kbps, both not being equal to each other, such inequality causes a decrease in communication quality. Thus, the accommodating-station-side control-channel control unit 11 calculates a new number of timeslots and voice band from the SDSL upward high-frequency band, based on the following equations. The SDSL upward high-frequency band>=64 Kbps×n (the number of timeslots) ("n" is the highest number that satisfies the left equation)

A voice band in this case=64 Kbps×$n$

The accommodating-station-side control-channel control unit 11 acquires a new voice band 1344 Kbps and a new number 21 of timeslots, and sets the new voice band 1344 Kbps and number 21 of timeslots to the accommodating-station-side voice-band-data storage unit 24. Additionally, the accommodating-station-side control-channel control unit 11 notifies the accommodating-station-side SDSL modem 10 about a communication rate of the voice band. Further, the number 21 of the timeslots is set in the TS-availability-data storage unit 21 in the accommodating-station-side control-channel control unit 11. Additionally, 1 (empty) is set to data corresponding to the TS numbers 1 through 21 in the TS-availability-data storage unit 21 in the accommodating-station-side control-channel control unit 11.

The TS/band management unit 19 notifies the accommodating-station-side message control unit 18 about the determined voice band and number of the timeslots. The accommodating-station-side message control unit 18 transmits the new voice band and number of the timeslots to the subscriber-terminal-side control-channel control unit 6, via the accommodating-station-side splitter 9, the analog subscriber line and the subscriber-terminal-side splitter 4, by using the message format shown in FIG. 14.

The subscriber-terminal-side message control unit 15 in the subscriber-terminal-side control-channel control unit 6 analyzes the received message, and notifies the TS/band control unit 16 about the voice band and the number of the timeslots. The TS/band control unit 16 sets the notified voice band 1344 Kbps and the notified number 21 of the timeslots to the subscriber-terminal-side voice-band-data storage unit 17, and notifies the subscriber-terminal-side SDSL modem 5 about a communication rate of the new voice band. After completion of the setting, the subscriber-terminal-side message control unit 15 transmits a response to the voice-band-notification message, by using the message format shown in FIG. 15, to the accommodating-station-side control-channel control unit 11 via the subscriber-side splitter 4, the analog subscriber line 3 and the accommodating-station splitter 9.

According to the above processes, recognition of a band used as the voice band and the number of timeslots can be matched again between the subscriber terminal 1 and the accommodating station 2.

Next, the accommodating-station-side control-channel control unit 11 notifies the switch control unit 13 that the subscriber (a) has called out, after receiving the voice-band-notification response message from the subscriber terminal 1. The switch control unit 13 notifies the accommodating-station-side control-channel control unit 11 about a destination timeslot of the switch unit 14 (for example, the TS number 2). Additionally, the accommodating-station-side control-channel control unit 11 extracts an empty TS (for example, the TS number 1) from the TS-availability-data storage unit 21, and notifies the accommodating-station-side timeslot control unit 12 about the empty TS with a destination TS (the TS number 2) of the switch unit 14.

The accommodating-station-side timeslot management unit 22 in the accommodating-station-side timeslot control unit 12 stores the notified destination TS number 2 of the switch unit 14 in an area corresponding to the TS number 1 inside the accommodating-station-side TS-connection-data storage unit 23. The accommodating-station-side control-channel control unit 11 transmits the TS number 1 by using the message format shown in FIG. 17, to the subscriber-terminal-side control-channel control unit 6 via the accommodating-station-side splitter 9, the analog subscriber line 3 and the subscriber-terminal-side splitter 4.

The subscriber-terminal-side message control unit 15 in the subscriber-terminal-side control-channel control unit 6 analyzes the received message, and requests the TS/band control unit 16 for assigning a timeslot to the subscriber (a). The TS/band control unit 16 requests the subscriber-terminal-side timeslot control unit 7 for assigning the notified TS number 1 to the subscriber (a). The subscriber-terminal-side timeslot management unit 22 in the subscriber-terminal-side timeslot control unit 7 stores the notified TS number 1 in an area corresponding to the subscriber (a) inside the subscriber-terminal-side TS/subscriber-correspondence-data storage unit 23.

Figure 27:
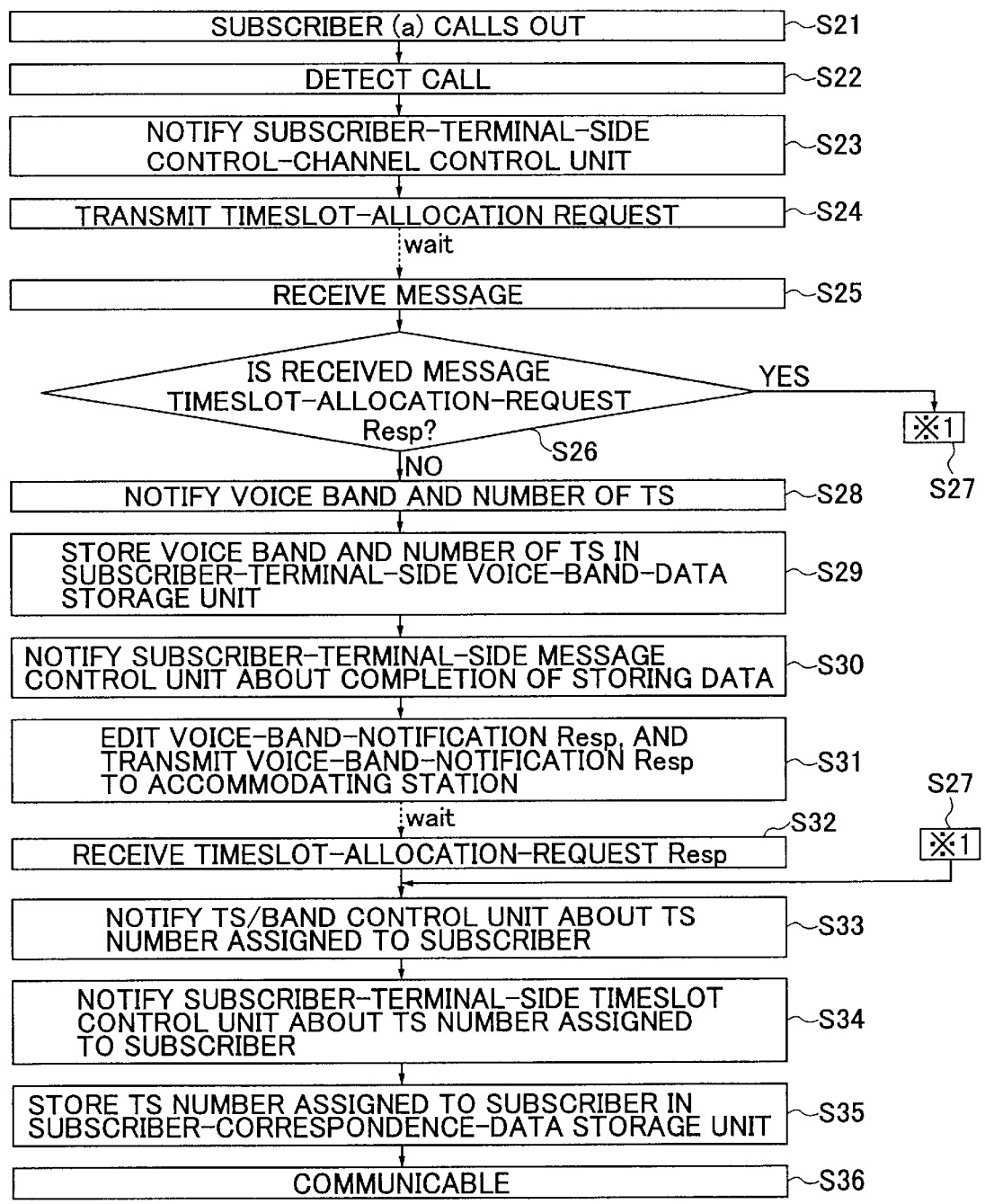
FIG. 27 is a flowchart showing an example of a process carried out by the subscriber terminal at a time of calling out.

Accordingly, communication with the subscriber (a) is enabled. FIG. 27 is an example of a subscriber-terminal-side process flow when a subscriber calls out after the subscriber terminal starts up. A description will be given of a process carried out by the subscriber terminal 1 sequentially, along with FIG. 27.

S21: The subscriber (a) calls out.
S22: The subscriber-monitoring control unit 8 detects the call made by the subscriber (a).
S23: The subscriber-monitoring control unit 8 notifies the subscriber-terminal-side control-channel control unit 6 about the call made by the subscriber (a).
S24: The subscriber-terminal-side message control unit 15 in the subscriber-terminal-side control-channel control unit 6 edits a timeslot-allocation-request message format, and transmits the timeslot-allocation request message to the accommodating station 2.
S25: The subscriber-terminal-side control-channel control unit 6 receives a message from the accommodating station 2.
S26: Is the received message a timeslot-allocation-request response message?

In a case in which the received message is the timeslot-allocation-request response message, the subscriber terminal 1 jumps to S33. On the other hand, in a case in which the received message is not the timeslot-allocation-request response message, the subscriber terminal 1 proceeds to S28.

S28: The subscriber-terminal-side message control unit 15 notifies the TS/band control unit 16 about the notified voice band 1344 Kbps and number 21 of the timeslots.
S29: The Ts/band control unit 16 stores the notified voice band 1344 Kbps and number 21 of the timeslots in the subscriber-terminal-side voice-band-data storage unit 17, and notifies the subscriber-terminal-side SDSL modem 5 about a communication rate of the voice band.
S30: The TS/band control unit 16 notifies the subscriber-terminal-side message control unit 15 that data settings are completed.
S31: The subscriber-terminal-side message control unit 15 edits a voice-band-notification response message format, and transmits the voice-band-notification response message to the accommodating station 2.
S32: The subscriber-terminal-side message control unit 15 receives the timeslot-allocation-request response message.
S33: The subscriber-terminal-side message control unit 15 extracts the TS number 1 assigned to the subscriber (a) from the timeslot-allocation-request response message, and notifies the TS/band control unit 16 about the TS number 1.
S34: The TS/band control unit 16 notifies the subscriber-terminal-side timeslot control unit 7 about the assigned TS number 1.
S35: The subscriber-terminal-side timeslot management unit 22 in the subscriber-terminal-side timeslot control unit 7 stores the TS number 1 assigned to the subscriber (a) in an area corresponding to the subscriber (a) inside the subscriber-terminal-side TS/subscriber-correspondence-data storage unit 23.
S36: Accordingly, a timeslot is connected to the subscriber (a), and communication is enabled.

Figure 28:
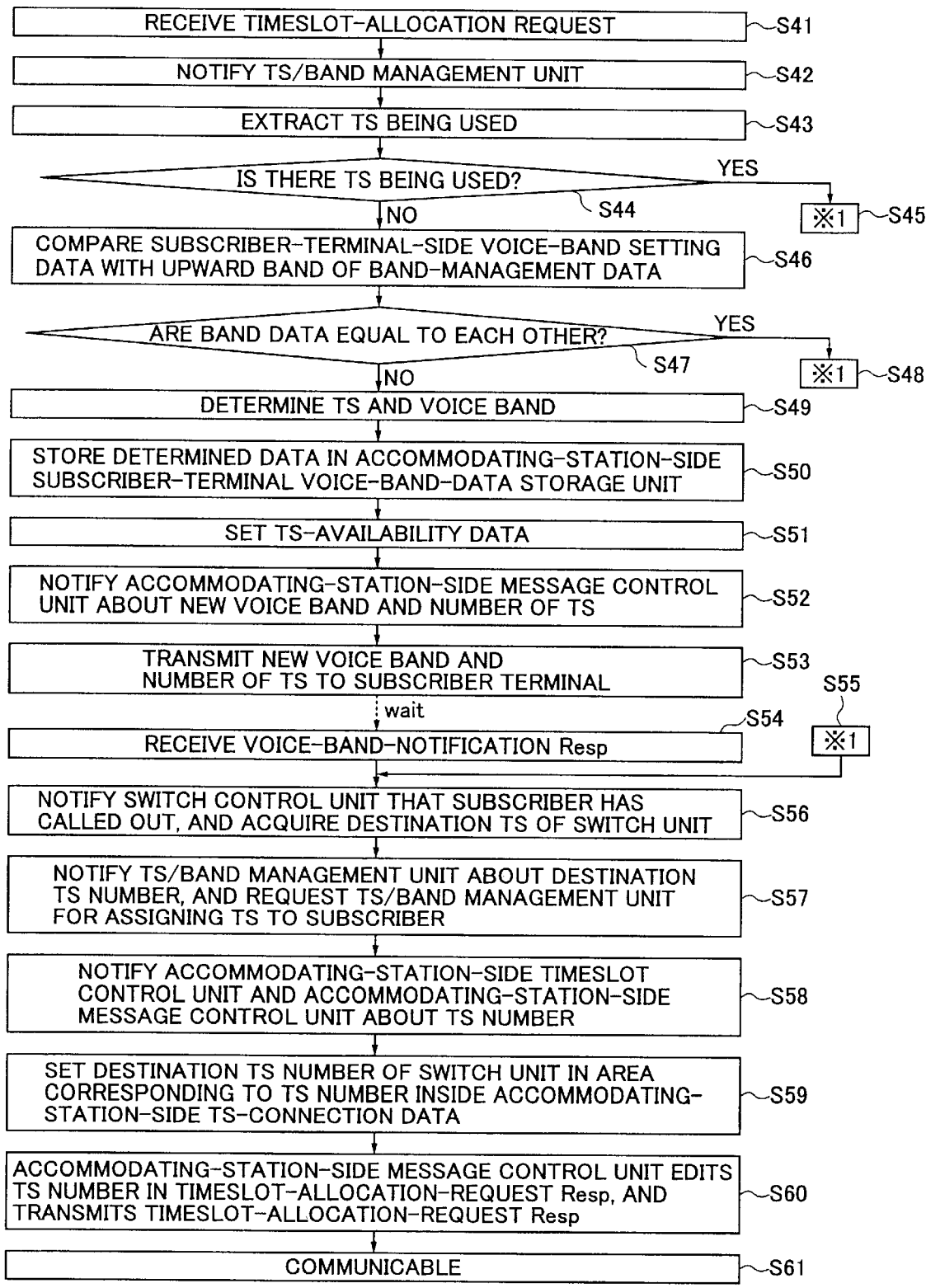
FIG. 28 is a flowchart showing an example of a process carried out by the accommodating station at the time of calling out.

FIG. 28 is an example of an accommodating-station-side process flow when a subscriber calls out after the subscriber terminal starts up. A description will be given of a process carried out by the accommodating station 2 sequentially, along with FIG. 28.

S41: The accommodating station 2 receives the timeslot-allocation request message.
S42: The accommodating-station-side message control unit 18 in the accommodating-station-side control-channel control unit 11 analyzes the received message, and notifies the TS/band management unit 19 about the received message.
S43: The TS/band management unit 19 extracts a timeslot being used from the TS-availability-data storage unit 21.
S44: Are there any timeslots being used?

In a case in which there is a timeslot being used, the accommodating station 2 jumps to S56. On the other hand, in a case in which there is no timeslot being used, the accommodating station 2 proceeds to S46.

S46: The TS/band management unit 19 compares the band 1536 Kbps set in the subscriber-terminal-side voice-band-setting-data storage unit 24, with the upward band 1350 Kbps in the band-management-data storage unit 20.
S47: Are data of the both bands equal to each other?

In a case in which the data of the both bands are equal, the accommodating station 2 jumps to S56. On the other hand, in a case in which the data of the both bands are not equal, the accommodating station 2 proceeds to S49.

S49: The TS/band management unit 19 determines the highest value n=21 that satisfies a conditional equation 1350 Kbps>=64 Kbps×n as the number of timeslots, and determines 64 Kbps×21=1344 Kbps as the voice band.
S50: The TS/band management unit 19 stores the voice band 1344 Kbps and the number 21 of the timeslots in the accommodating-station-side subscriber-terminal-side voice-band-setting-data storage unit 24, and notifies the accommodating-station-side SDSL modem 10 about a communication rate of the voice band.
S51: The TS/band management unit 19 sets the number 21 of the timeslots, and 1 (empty) to bits corresponding to the TS numbers 1 through 21, in the TS-availability-data storage unit 21.

S52: The TS/band management unit 19 notifies the accommodating-station-side message control unit 18 about the new voice band 1344 Kbps and the new number 21 of the timeslots.

S53: The accommodating-station-side message control unit 18 edits the new voice band 1344 Kbps and number 21 of the timeslots notified from the TS/band management unit 19 to the voice-band-notification message format, and transmits the voice-band-notification message to the subscriber terminal 1.

S54: The accommodating-station-side message control unit 18 receives the voice-band-notification response message.

S56: The accommodating-station-side message control unit 18 in the accommodating-station-side control-channel control unit 11 notifies the switch control unit 13 that the subscriber (a) has called out, and acquires destination timeslot (the TS number 2) data of the switch unit 14.

S57: The accommodating-station-side message control unit 18 in the accommodating-station-side control-channel control unit 11 notifies the TS/band management unit 19 about the destination TS number 2 of the switch unit 14, and requests the TS/band management unit 19 for assigning a timeslot to the subscriber (a).

S58: The TS/band management unit 19 extracts an empty timeslot (the TS number 1) from the TS-availability-data storage unit 21. The TS/band management unit 19 notifies the accommodating-station-side timeslot control unit 12 about the TS number 1 and the destination TS number 2 of the switch unit 14, and notifies the accommodating-station-side message control unit 18 about the TS number 1.

S59: The accommodating-station-side timeslot management unit 22 in the accommodating-station-side timeslot control unit 12 stores the notified TS number 2 of the switch unit 14 in an area corresponding to the TS number 1 inside the accommodating-station-side TS-connection-data storage unit 23.

S60: The accommodating-station-side message control unit 18 edits the TS number 1 to the timeslot-allocation-request response message format, and transmits the timeslot-allocation-request response message.

S61: Accordingly, communication with the subscriber (a) is enabled.

(Call Reception at a Subscriber)

Next, a description will be given of a process when a call is received by the subscriber (a). In this process, the description will be given in a case in which the upward bands in the accommodating-station-side voice-band-data storage unit 24 and the band-management-data storage unit 20 are 1.5 Mbps, and match with each other.

Figure 11:
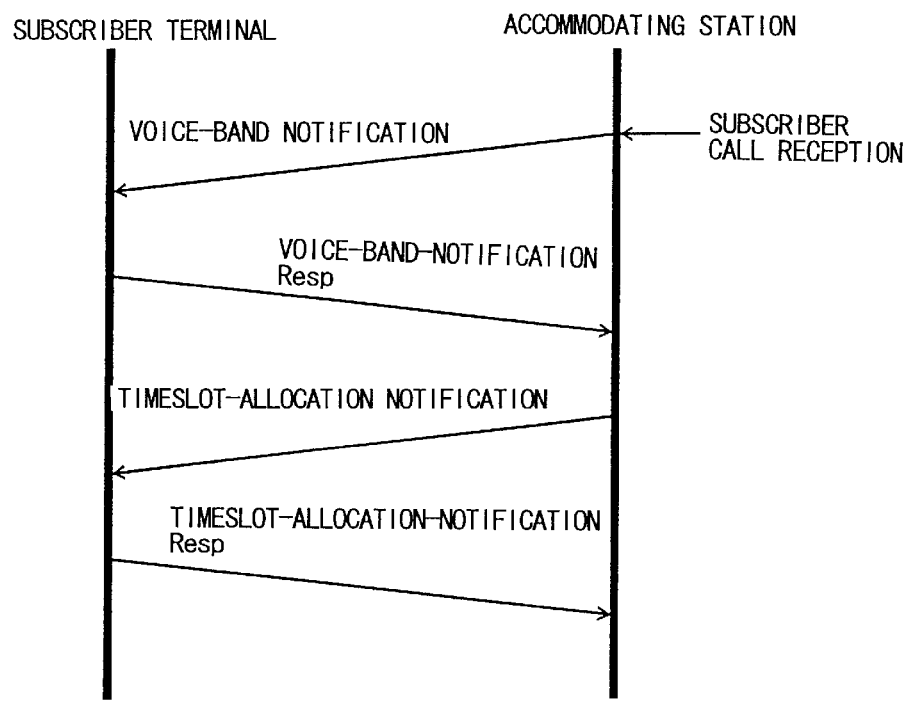
FIG. 11 is a diagram showing an example of a sequence at a time of receiving a call.
Figure 12:
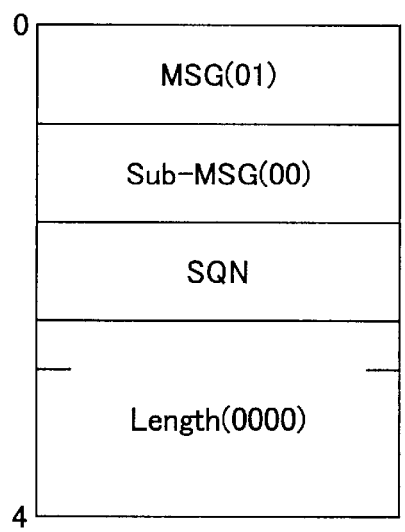
FIG. 12 is a diagram showing an example of a format of a voice-band-allocation request.
Figure 13:
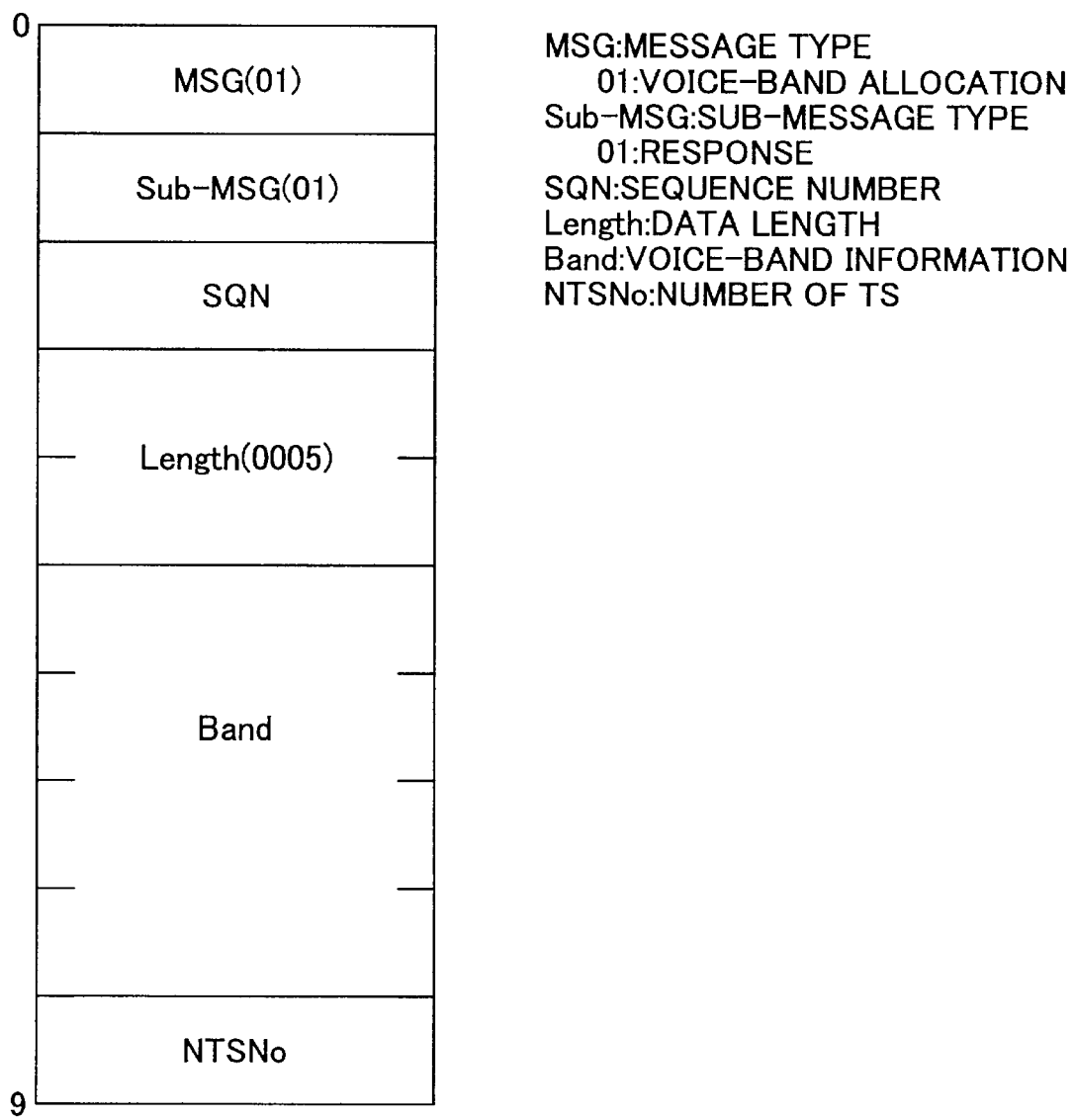
FIG. 13 is a diagram showing an example of a format of a voice-band-allocation-request response (Resp)

FIG. 11 shows an example of a sequence at the time of the call reception.

Figure 14:
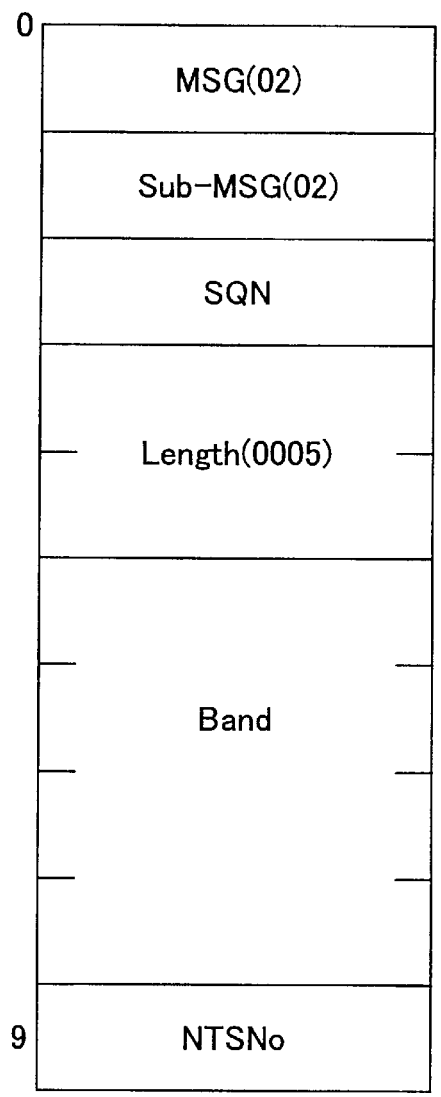
FIG. 14 is a diagram showing an example of a format of a voice-band notification.
Figure 15:
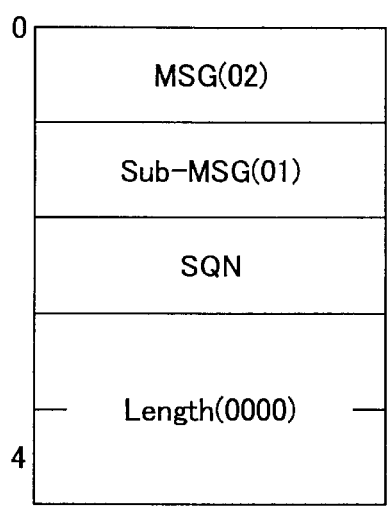
FIG. 15 is a diagram showing an example of a format of a voice-band-notification response.

When a call is received by a subscriber, the accommodating station 2 confirms a voice band to be used, and transmits the voice-band-notification message shown in FIG. 14 to the subscriber terminal 1. The subscriber terminal 1 returns the voice-band-notification response message shown in FIG. 15 by matching the message to the notified voice band. Subsequently, the accommodating station 2 transmits a timeslot-allocation notification message shown in FIG. 18 to the subscriber terminal 1. In response to this timeslot-allocation notification message, the subscriber terminal 1 transmits a timeslot-allocation-notification response message shown in FIG. 19 to the accommodating station 2.

A detailed description will be given of a process at the time of call reception to the subscriber. The switch control unit 13 notifies the accommodating-station-side control-channel control unit 11 about the call reception at the subscriber (a) with the destination timeslot (for example, the TS number 2) of the switch unit 14. The accommodating-station-side message control unit 18 in the accommodating-station-side control-channel control unit 11 analyzes the received message, and requests the TS/band management unit 19 for allocating a timeslot.

The TS/band management unit 19 checks the TS availability data in the TS-availability-data storage unit 21, and compares the accommodating-station-side voice-band data in the accommodating-station-side voice-band-data storage unit 24 with the upward band data of the band-management data in the band-management-data storage unit 20 in a case in which all the timeslots are empty. In a case in which the accommodating-station-side voice-band data matches with the upward band data of the band-management data, the TS/band management unit 19 in the accommodating-station-side control-channel control unit 11 reads out an empty timeslot (for example, the TS number 1) from the TS-availability-data storage unit 21, and notifies the accommodating-station-side timeslot control unit 12 about the empty timeslot with the destination timeslot (the TS number 2) of the switch unit 14.

The accommodating-station-side timeslot management unit 22 in the accommodating-station-side timeslot control unit 12 stores the notified destination TS number 2 in an area corresponding to the TS number 1 inside the accommodating-station-side TS-connection-data storage unit 23. The accommodating-station-side control-channel control unit 11 notifies the subscriber-terminal-side control-channel control unit 6 about the call reception at the subscriber (a) with the empty timeslot (the TS number 1), by using the message format shown in FIG. 18, via the accommodating-station-side splitter 9, the analog subscriber line 3 and the subscriber-terminal-side splitter 4.

The subscriber-terminal-side message control unit 15 in the subscriber-terminal-side control-channel control unit 6 analyzes the received message, and requests the TS/band control unit 16 for assigning a timeslot to the subscriber (a). The TS/band control unit 16 requests the subscriber-terminal-side timeslot control unit 7 for assigning the timeslot notified to the subscriber (a). The subscriber-terminal-side timeslot management unit 22 in the subscriber-terminal-side timeslot control unit 7 stores the notified TS number 1 in an area corresponding to the subscriber (a) inside the subscriber-terminal-side TS/subscriber-correspondence-data storage unit 23. Accordingly, communication with the subscriber (a) is enabled.

Accordingly, A timeslot to be used is notified and connected only when a subscriber communicates through the control channel, and, thus, the timeslot is not necessarily connected to the subscriber constantly. Consequently, communication is enabled even if the number of accommodated subscribers is larger than the number of usable timeslots.

Figure 29:
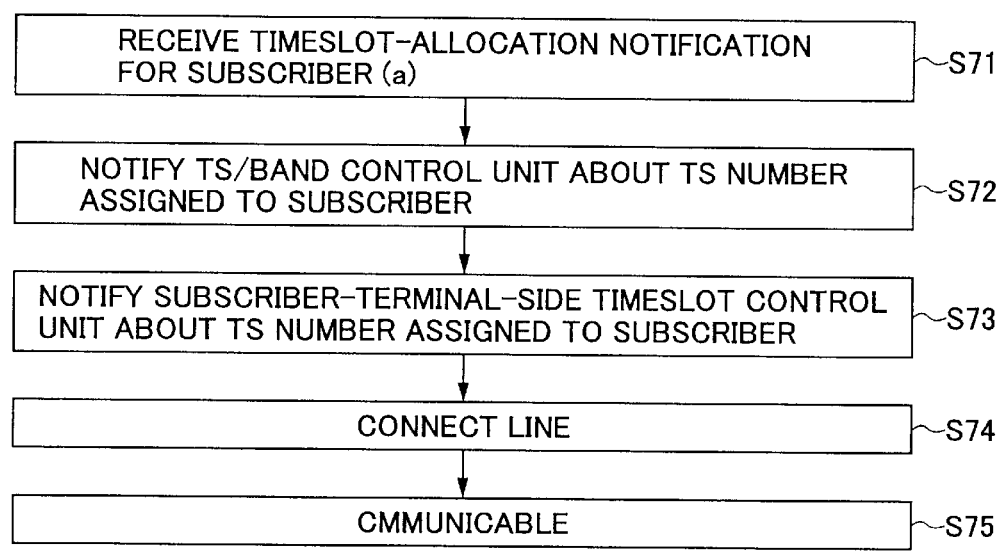
FIG. 29 is a flowchart showing an example of a process carried out by the subscriber terminal at a time of receiving a call.

FIG. 29 is an example of a subscriber-terminal-side process flow at a time of receiving a call. A description will be given of a process carried out by the subscriber terminal 1 sequentially, along with FIG. 29.

S71: The subscriber terminal 1 receives the timeslot-allocation notification message to a subscriber.

S72: The subscriber-terminal-side message control unit 15 in the subscriber-terminal-side control-channel control unit 6 notifies the TS/band control unit 16 about the TS number 1 assigned to the subscriber (a).

S73: The TS/band control unit 16 notifies the subscriber-terminal-side timeslot control unit 7 about the TS number 1 assigned to the subscriber (a).

S74: The subscriber-terminal-side timeslot management unit 22 stores the TS number 1 assigned to the subscriber (a) in an area corresponding to the subscriber (a) inside the subscriber-terminal-side TS/subscriber-correspondence-data storage unit 23.

S75: Accordingly, a TS 1 is connected to the subscriber (a), and the subscriber (a) becomes communicable.

Figure 30:
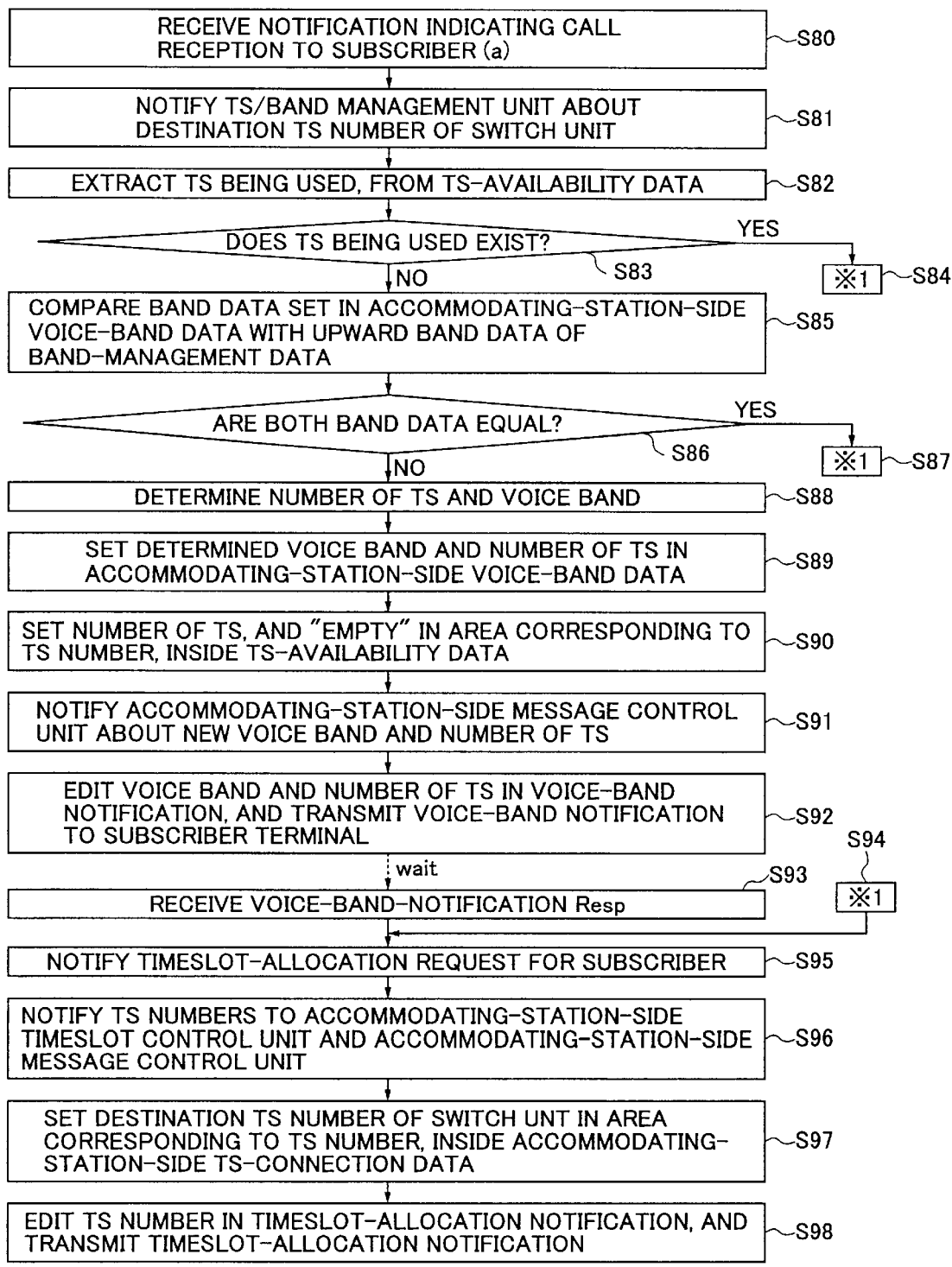
FIG. 30 is a flowchart showing an example of a process carried out by the accommodating station at the time of receiving a call.

FIG. 30 is an example of an accommodating-station-side process flow at the time of receiving a call. A description will be given of a process carried out by the accommodating station 2 sequentially, along with FIG. 30.

S80: The accommodating station 2 receives a call-reception notification message to a subscriber.

S81: The accommodating-station-side message control unit 18 in the accommodating-station-side control-channel control unit 11 analyzes the received message, and notifies the TS/band management unit 19 about the destination TS number 2 of the switch unit 14.

S82: The TS/band control unit 19 extracts a timeslot being used, from the TS-availability-data storage unit 21.

S83: Are there any timeslots being used?

In a case in which a timeslot being used exists, the accommodating station jumps to S96. On the other hand, in a case in which a timeslot being used does not exist, the accommodating station 2 proceeds to S85.

S85: The TS/band management unit 19 compares the band data 1536 Kbsp stored in the accommodating-station-side voice-band-data storage unit 24, with the upward band data 1536 Kbsp of the band-management data stored in the band-management-data storage unit 20.

S86: Are the both band data equal to each other?

In a case in which the both band data are equal, the accommodating station 2 jumps to S96. On the other hand, in a case in which the both data are not equal, the accommodating station 2 proceeds to S88.

S88: The TS/band management unit 19 extracts the upward band stored in the band-management-data storage unit 20, and determines the highest value that satisfies a conditional equation "the upward band>=64 Kbps×n" as the number of timeslots. Additionally, the TS/band management unit 19 determines 64 Kbps×n as the voice band.

S89: The TS/band management unit 19 stores the determined voice band and number of the timeslots in the accommodating-station-side voice-band-data storage unit 24, and notifies the accommodating-station-side SDSL modem 10 about a communication rate of the voice band.

S90: The TS/band management unit 19 assigns consecutive numbers starting from 1 to the timeslots, for the number of the timeslots. Additionally, the TS/band management unit 19 stores the number of the timeslots, and 1 (empty) in an area corresponding to a TS number, in the TS-availability-data storage unit 21.

S91: The TS/band management unit 19 notifies the accommodating-stations-side message control unit 18 about the new voice band and number of the timeslots.

S92: The accommodating-station-side message control unit 18 edits the voice band and the number of the timeslots notified from the TS/band management unit 19 to the voice-band-notification message format, and transmits the voice-band notification message to the subscriber terminal 1.

S93: The accommodating-station-side message control unit 18 receives the voice-band-notification response message.

S95: The accommodating-station-side message control unit 18 notifies the TS/band management unit 19 about the timeslot-allocation request for the subscriber (a).

S96: The TS/band management unit 19 extracts an empty timeslot (for example, the TS number 1) from the TS-availability-data storage unit 21. Additionally, the TS/band management unit 19 notifies the accommodating-station-side timeslot control unit 12 about the TS number 1 and the destination TS number 2 of the switch unit 14, and notifies the accommodating-station-side message control unit 18 about the TS number 1.

S97: The accommodating-station-side timeslot management unit 22 in the accommodating-station-side timeslot control unit 12 stores the notified destination TS number 2 of the switch unit 14 in an area corresponding to the TS number 1 inside the accommodating-station-side TS-connection-data storage unit 23.

S98: The accommodating-station-side message control unit 18 inserts the TS number 1 to the timeslot-allocation-notification message format, and transmits the timeslot-allocation notification message.

(A Second Embodiment)

Next, a description will be given of the second embodiment by using FIGS. 31 through 43.

Figure 34:
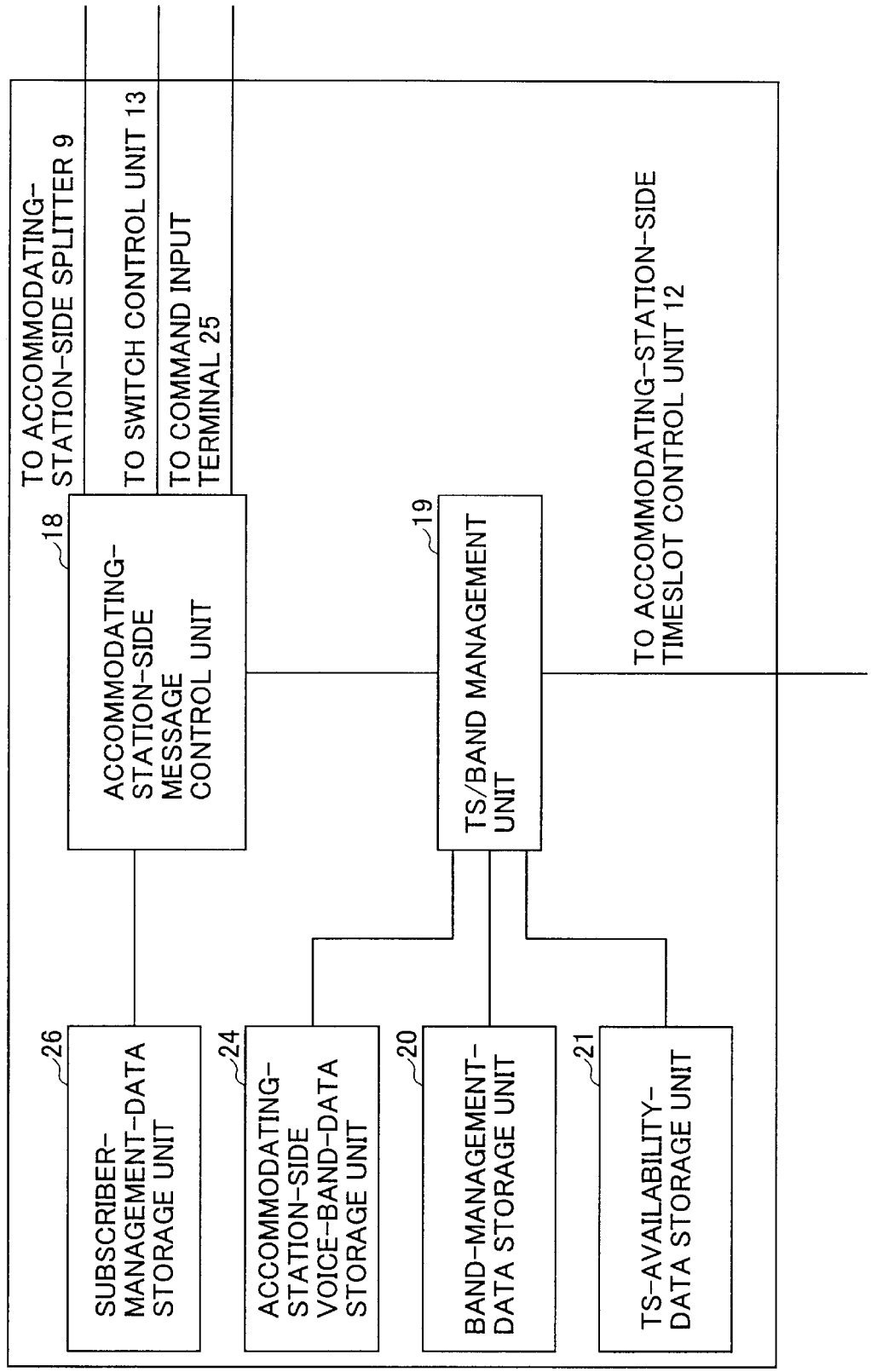
FIG. 34 is a block diagram showing an example of a composition of an accommodating-station-side control-channel control unit according to the second embodiment.

FIG. 34 is an example of a block composition of the accommodating-station-side control-channel control unit 11. FIG. 34 further includes a subscriber-management-data storage unit 26 in addition to the block composition shown in FIG. 6. This subscriber-management-data storage unit 26 stores subscriber management data for managing a condition of a subscriber.

Figure 35:
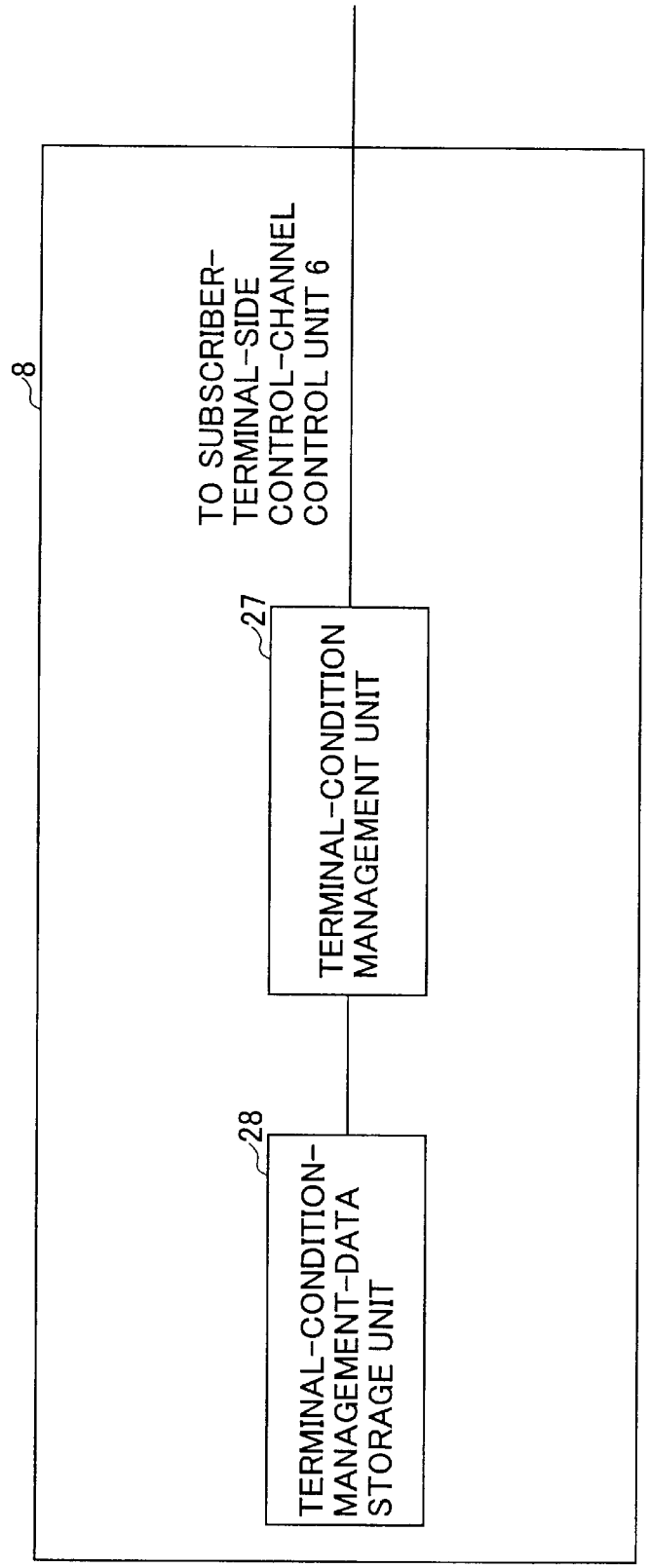
FIG. 35 is a block diagram showing an example of a composition of a subscriber-monitoring control unit according to the second embodiment.
Figure 36:
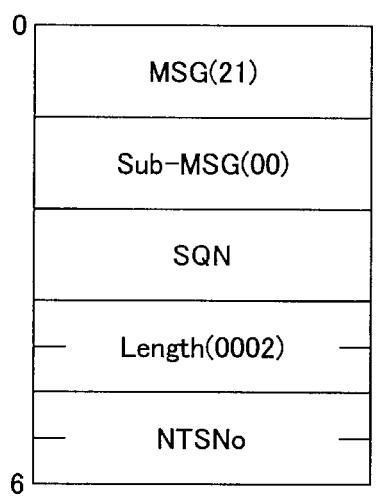
FIG. 36 is a diagram showing an example of a format of a subscriber condition request.

Additionally, FIG. 35 is an example of a block composition of the subscriber-monitoring control unit 8. A terminal-condition management unit 27 manages a condition of a subscriber. A terminal-condition-management-data storage unit 28 stores terminal-condition management data for managing a condition of a subscriber.

Figure 31:
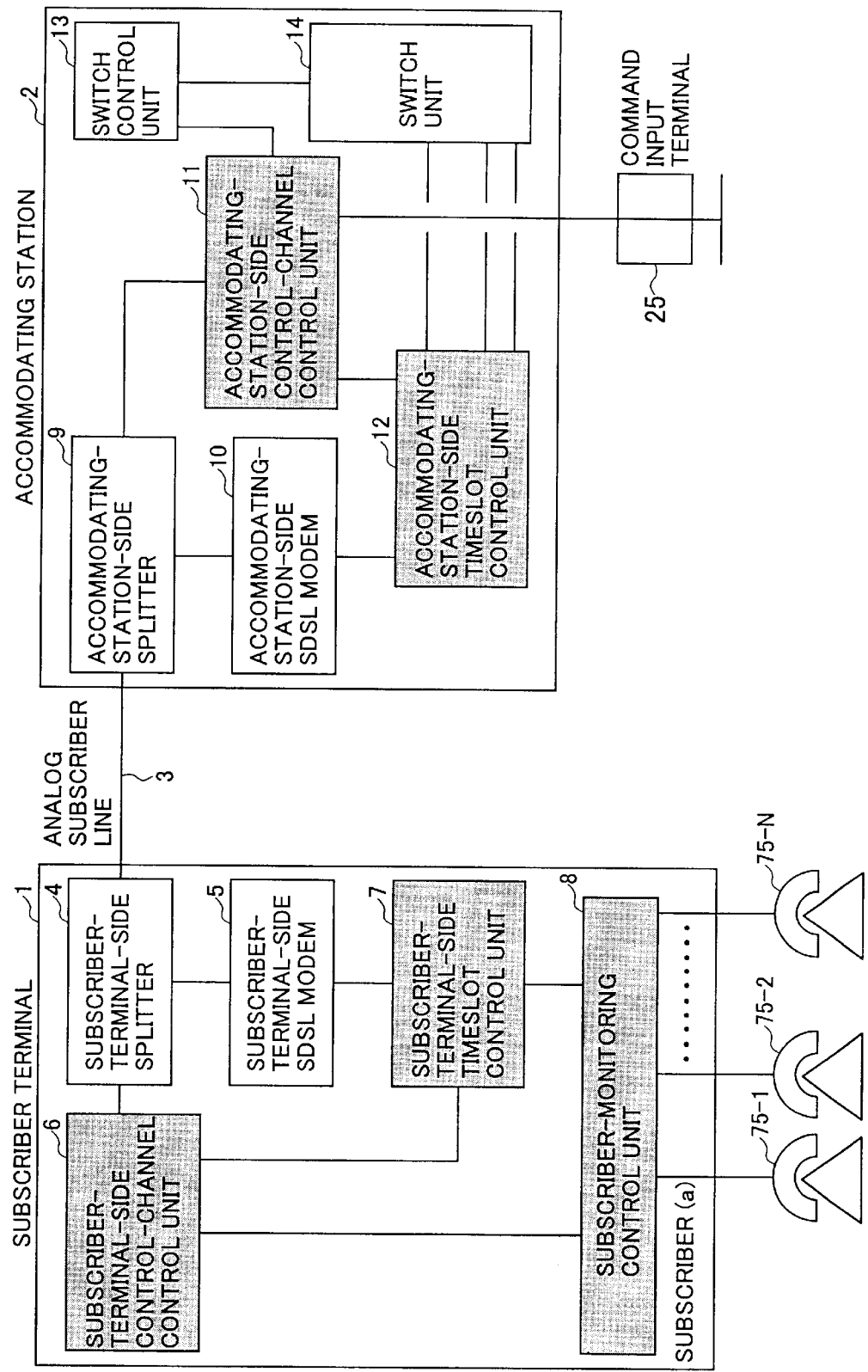
FIG. 31 is a block diagram showing a second embodiment of the present invention.

A command is inputted from a command input terminal 25 shown in FIG. 31 to check a condition of the subscriber (a) on the subscriber-terminal side. The command input unit 25 notifies the accommodating-station-side control-channel control unit 11 by using a subscriber-condition request message format shown in FIG. 36.

Figure 38:
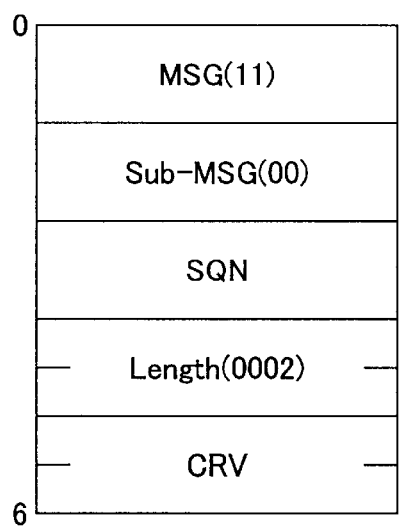
FIG. 38 is a diagram showing an example of a format of a subscriber-condition notification request.
Figure 39:
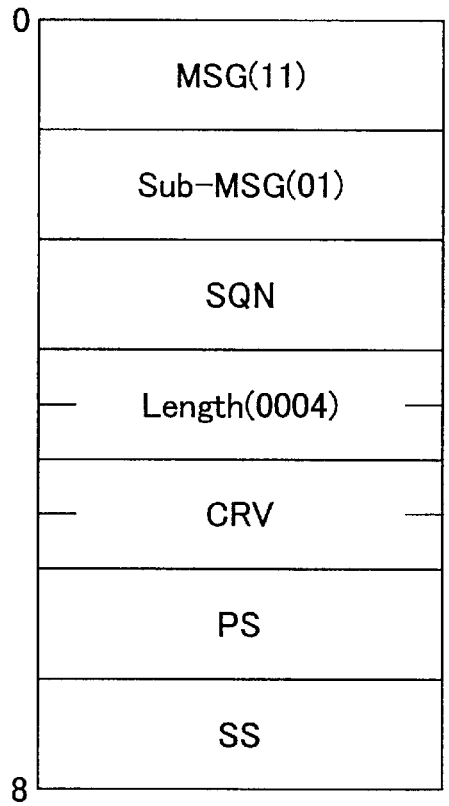
FIG. 39 is a diagram showing an example of a format of a subscriber-condition-notification-request response.
Figure 40:
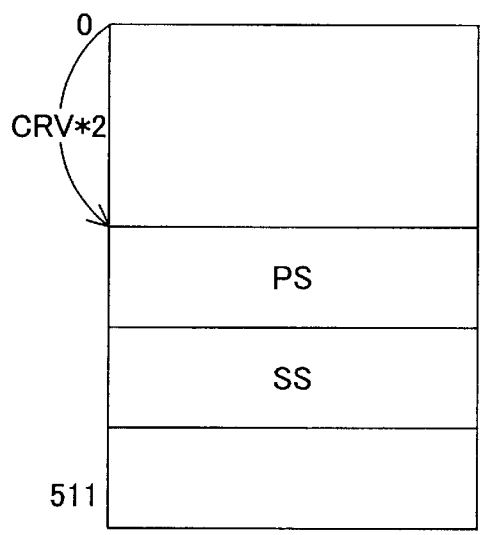
FIG. 40 is a diagram showing an example of a format of subscriber management data.
Figure 41:
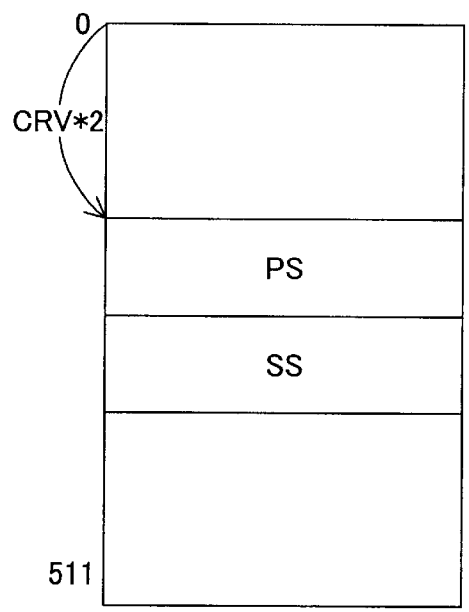
FIG. 41 is a diagram showing an example of a format of terminal-condition management data.

The accommodating-station-side message control unit 18 in the accommodating-station-side control-channel control unit 11 analyzes the received message, and transmits the message to the subscriber-terminal-side control-channel control unit 6 via the accommodating-station-side splitter 9, the analog subscriber line 3 and the subscriber-terminal-side splitter 4, by using a subscriber-condition-notification request message format shown in FIG. 38.

The subscriber-terminal-side message control unit 15 in the subscriber-terminal-side control-channel control unit 6 analyzes the received message, and notifies the subscriber-monitoring control unit 8 about the message. The terminal-condition management unit 27 in the subscriber-monitoring control unit 8 extracts information about the subscriber (a) from the terminal-condition-management-data storage unit 28, and notifies the subscriber-terminal-side control-channel control unit 6 about the information. The subscriber-terminal-side message control unit 15 in the subscriber-terminal-side control-channel control unit 6 transmits a subscriber-condition-notification-request response message shown in FIG. 39 to the accommodating-station-side control-channel control unit 11 via the subscriber-terminal-side splitter 4, the analog subscriber line 3 and the accommodating-station-side splitter 9.

Figure 32:
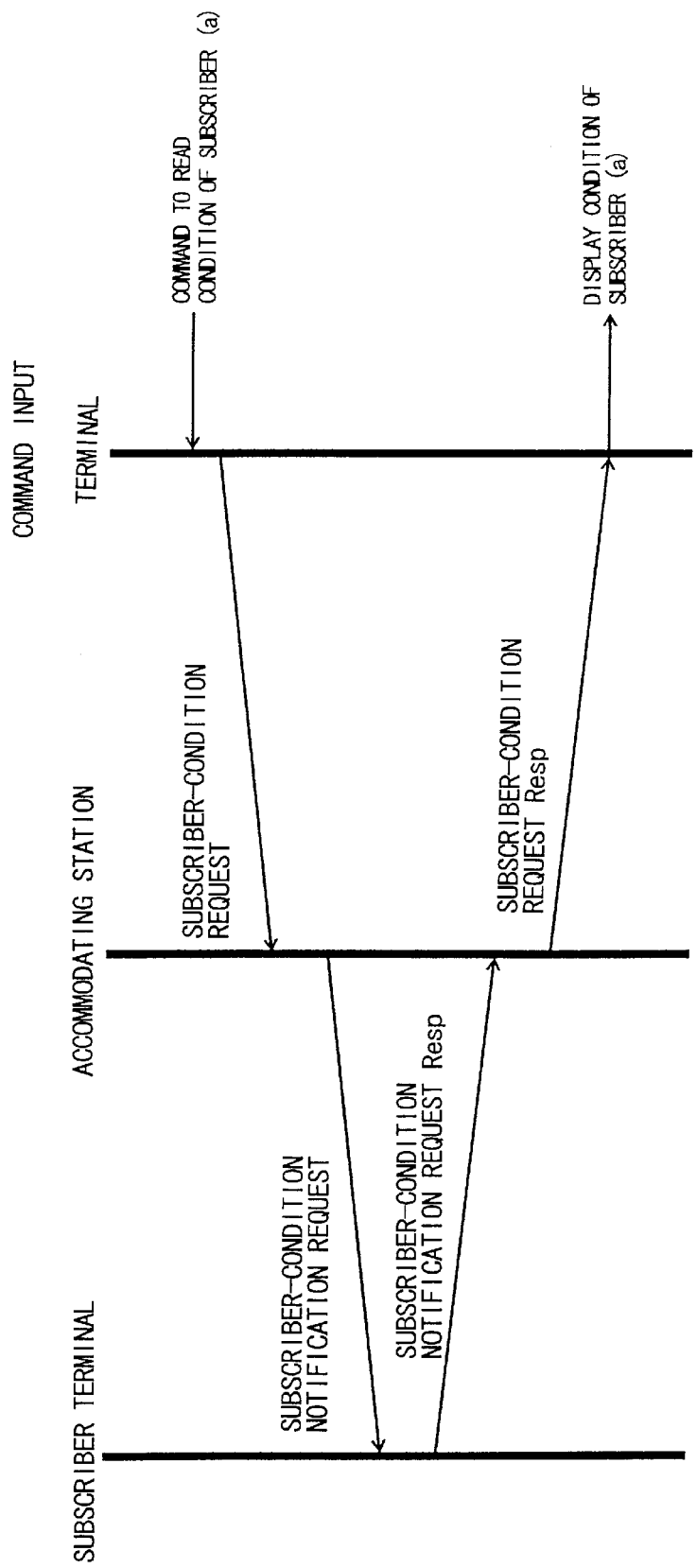
FIG. 32 is a diagram showing an example of a sequence to read subscriber information.
Figure 33:
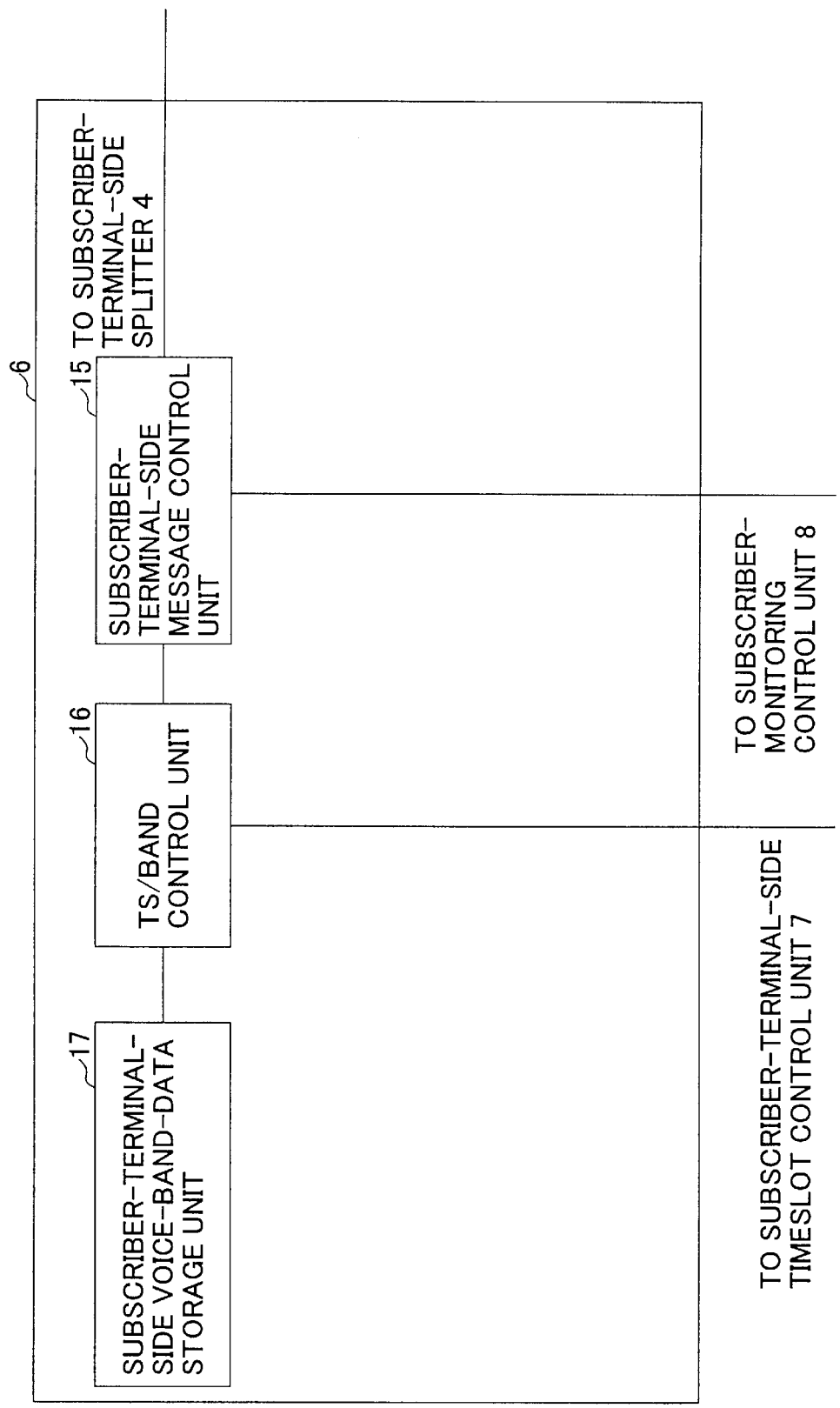
FIG. 33 is a block diagram showing an example of a composition of a subscriber-terminal-side control-channel control unit according to the second embodiment.
Figure 37:
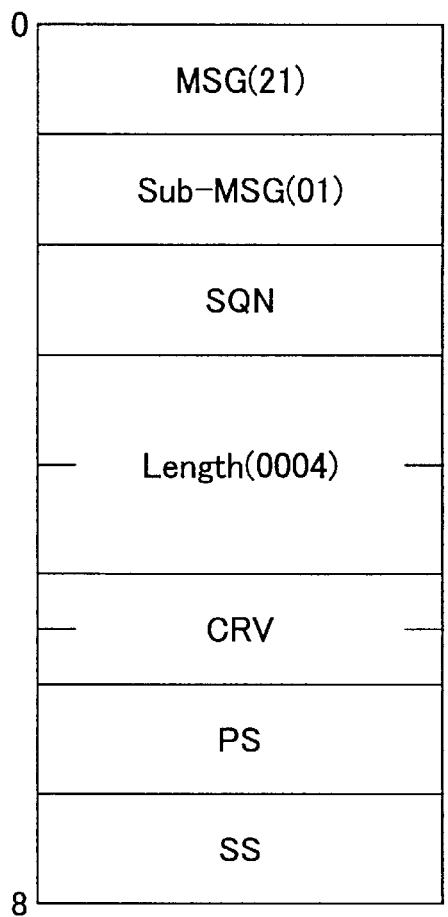
FIG. 37 is a diagram showing an example of a format of a subscriber-condition-request response.

The accommodating-station-side message control unit 18 in the accommodating-station-side control-channel control unit 11 analyzes the received message, and transmits the information about the subscriber (a) to the command input terminal 25 where the information about the subscriber (a) is displayed, by using a subscriber-condition-request response message format shown in FIG. 37. FIG. 32 shows the above-described subscriber-information reading sequence.

Figure 42:
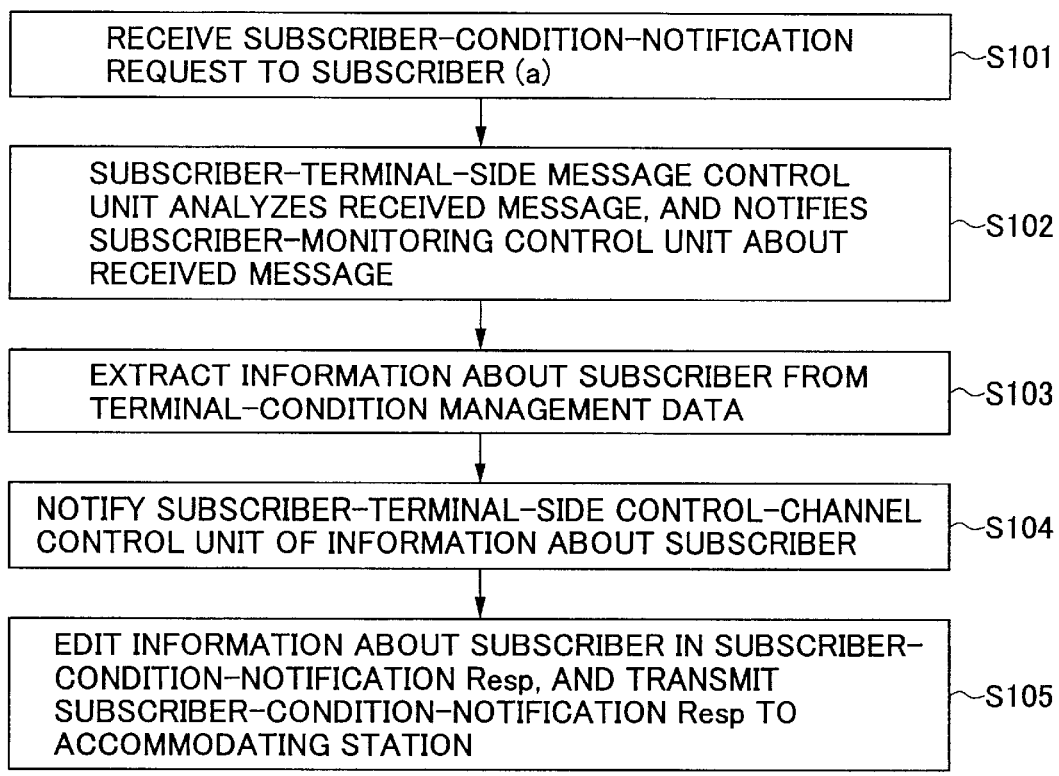
FIG. 42 is a flowchart showing an example of a process carried out by the subscriber terminal, according to the second embodiment.

FIG. 42 shows a subscriber-terminal-side process flow according to the present embodiment. A description will be given of a process carried out by the subscriber terminal 1 sequentially, along with FIG. 42.

S101: The subscriber terminal 1 receives the subscriber-condition-notification request message for a subscriber.

S102: The subscriber-terminal-side message control unit 15 in the subscriber-terminal-side control-channel control unit 6 analyzes the received message, and notifies the subscriber-monitoring control unit 8 about the message.

S103: The terminal-condition management unit 27 in the subscriber-monitoring control unit 8 reads out the information about the subscriber (a) from the terminal-condition-management-data storage unit 28.

S104: The terminal-condition-management unit 27 notifies the subscriber-terminal-side control-channel control unit 6 of the information about the subscriber (a).

S105: The subscriber-terminal-side message control unit 15 in the subscriber-terminal-side control-channel control unit 6 edits the information about the subscriber (a) in the subscriber-condition-notification response message format, and transmits the subscriber-condition-notification response message to the accommodating station 2.

Figure 43:
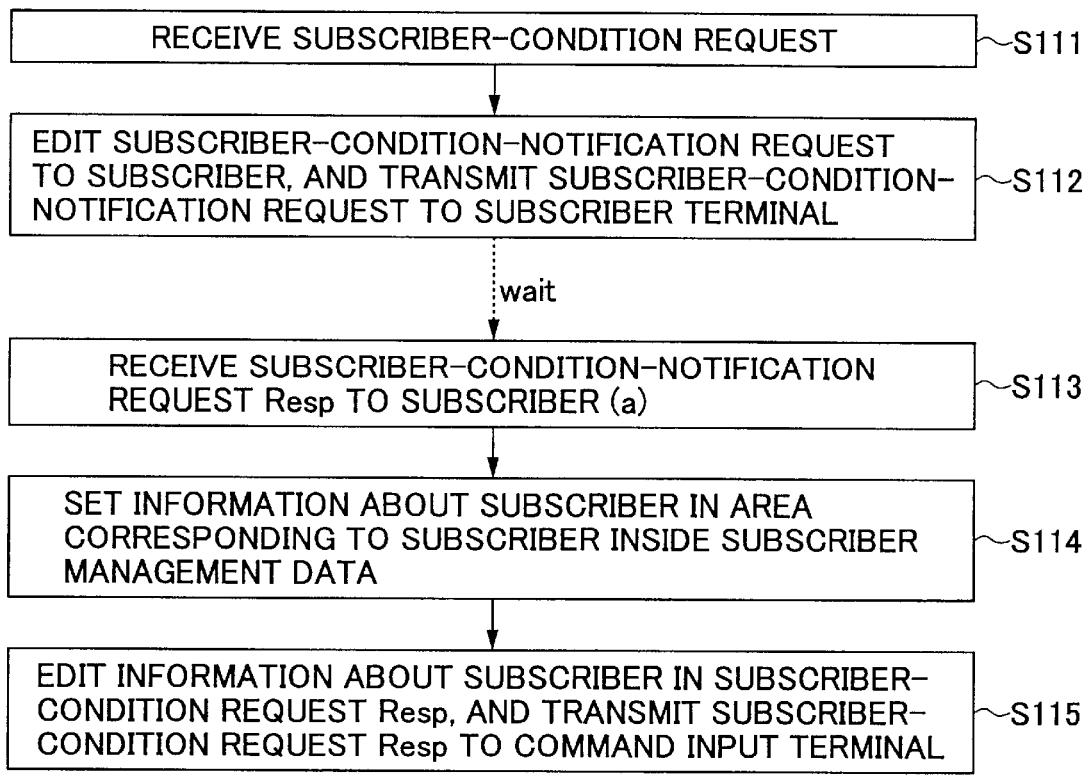
FIG. 43 is a flowchart showing an example of a process carried out by the accommodating station, according to the second embodiment.

FIG. 43 shows an accommodating-station-side process flow according to the present embodiment. A description will be given of a process carried out by the accommodating station 2 sequentially, along with FIG. 43.

S111: The accommodating station 2 receives the subscriber-condition message.

S112: The accommodating-station-side message control unit 18 in the accommodating-station-side control-channel control unit 11 analyzes the received message. Additionally, the accommodating-station-side message control unit 18 edits the subscriber-condition-notification request message format to the subscriber (a), and transmits the subscriber-condition-notification request message to the subscriber terminal.

S113: The accommodating-station-side message control unit 18 receives the subscriber-condition-notification-request response message to the subscriber.

S114: The accommodating-station-side message control unit 18 in the accommodating-station-side control-channel control unit 11 analyzes the received message, and stores the information about the subscriber (a) in an area corresponding to the subscriber (a), inside the subscriber-management-data storage unit 26.

S115: The accommodating-station-side message control unit 18 edits the information about the subscriber (a) to the subscriber-condition-request response message format, and transmits the subscriber-condition-request response message o the command input terminal 25.

Message formats shown in FIGS. 12, 13, 14, and 15 are used for synchronizing a high-frequency band at the subscriber terminal and the accommodating station. Additionally, message formats shown in FIGS. 16, 17, 18 and 19 are used for exchanging the subscriber information. Additionally, FIGS. 20, 21, 22, 23 and 24 are examples of formats of data stored in each storage unit.

As described above, the present invention achieves providing a communication service without placing a new analog subscriber line between an accommodating station and a subscriber even if the number of analog telephone subscribers increases, by converting a high-frequency band of an xDSL line using a single existing analog subscriber line to a digital signal, dividing the digital signal into timeslots, and assigning a plurality of subscribers to the timeslots.

In the above-described embodiments, a description has been given of the case in which the general telephone network uses timeslots. However, the general telephone network can use either other line switching or store-and-forward switching.

Additionally, in the above-described embodiments, a description has been given of the example using the SDSL modem. However, not only the SDSL modem but also other xDSL modems may be used in the present invention.

Additionally, in the above-described embodiments, a description has been given of the case in which correspondence between a band used as the voice band and the number of timeslots is one-to-one. However, the present invention is not limited to the above case, and can be applied to a case in which the correspondence between the band used as the voice band and the number of the timeslots is not one-to-one. In such a case, the number of the timeslots should match for synchronization.

As described above, the present invention achieves accommodation of a plurality of subscribers by use of a single analog subscriber line, by enabling allocation of a voice band to a high-frequency part of an xDSL line, and notification of a subscriber condition by using a low-frequency part as a control channel. Thus, the present invention achieves reduction of a cost for constructing an analog subscriber line, since a subscriber can be added by using an existing analog line without constructing a new subscriber line.

Additionally, the most appropriate communication quality to a noise characteristic of an xDSL is insured, according to the present invention.

Further, the number of accommodated subscribers can exceed a capacity of an xDSL line, and line-usage efficiency can be increased, according to the present invention.

Additionally, the present invention achieves controlling an operation condition of a subscriber either from a subscriber terminal or an accommodating station, and, thus, can achieve improvement on maintenance.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

What is claimed is:

1. A high-speed digital transmission method using an analog subscriber line, comprising the steps of:
   providing a subscriber distributing device, to which a plurality of subscribers are connected, in a subscriber terminal corresponding to said analog subscriber line;

setting a low-frequency band part as a control channel, and a high-frequency band part as one or a plurality of communication channels;

controlling said one or plurality of communication channels by using said control channel;

dividing said one or plurality of communication channels into a plurality of timeslots; and setting or changing a communication band or a number of said plurality of timeslots to be used, in accordance with a line condition of said analog subscriber line, by using said control channel;

wherein said plurality of subscribers communicate by using said analog subscriber line.

2. The high-speed digital transmission method as claimed in claim 1, further comprising the step of changing said communication band or said number of the plurality of timeslots to be used, when said plurality of subscribers call out or receive a call.

3. A subscriber accommodating system, comprising:

a subscriber-terminal-side accommodating device connected to a high-speed digital transmission path using an analog subscriber line; and an accommodating-station-side accommodating device connected to the high-speed digital transmission path using the analog subscriber line;

wherein said subscriber-terminal-side accommodating device includes a subscriber distributing device, to which a plurality of subscribers are connected; sets a low-frequency band part as a control channel; sets a high-frequency band part as one or a plurality of communication channels; and controls said one or plurality of communication channels by using said control channel;

wherein said subscriber-terminal-side accommodating device further includes a subscriber-monitoring control unit that monitors a change in conditions of said plurality of subscribers; and wherein said plurality of subscribers communicate by using said analog subscriber line.

4. A subscriber-terminal-side accommodating device connected to a high-speed digital transmission path using an analog subscriber line, wherein an accommodating-station-side accommodating device is connected to another end of said analog subscriber line, said subscriber-terminal-side accommodating device comprising:

a subscriber distributing device, wherein said subscriber-terminal-side accommodating device sets a low-frequency band part as a control channel, sets a high-frequency band part as one or a plurality of communication channels, and controls said one or plurality of communication channels by using said control unit; and a subscriber-monitoring control unit that monitors a change in conditions of said plurality of subscribers, wherein said plurality of subscribers communicate by using said analog subscriber line.

5. An accommodating-station-side accommodating device connected to a high-speed transmission path using an analog subscriber line, wherein a subscriber-terminal-side accommodating device is connected to another side of said analog subscriber line, said accommodating-station-side accommodating device comprising:

a splitter dividing frequency into a high-frequency band part and a low-frequency band part;

a modem modulating and demodulating for high-speed digital transmission;

a control-channel control unit determining said high-frequency band used as a voice band and a number of timeslots, and carrying out control related to the timeslots for a subscriber-terminal side and an accommodating-station side;

a switch unit carrying out line switching;

a switch control unit controlling said switch unit; and a timeslot control unit carrying out switching between a timeslot notified from said control-channel control unit and a timeslot or a line used by said switch unit, wherein each of a plurality of subscribers communicates through said analog subscriber line by using an allocated timeslot.

* * * * *